(12) United States Patent
Kanesalingam et al.

(10) Patent No.: US 9,673,990 B2
(45) Date of Patent: Jun. 6, 2017

(54) METHOD FOR ELIMINATING MUTING DURING EVOLVED MULTICAST BROADCAST SERVICE (EMBS) SERVICE CHANGE

(71) Applicant: Telefonaktiebolaget LM Ericsson (publ), Stockholm (SE)

(72) Inventors: Prabaharan Kanesalingam, Ottawa (CA); Kevin Smith, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 182 days.

(21) Appl. No.: 14/649,722

(22) PCT Filed: May 1, 2015

(86) PCT No.: PCT/IB2015/053204
§ 371 (c)(1),
(2) Date: Jun. 4, 2015

(87) PCT Pub. No.: WO2015/166470
PCT Pub. Date: Nov. 5, 2015

(65) Prior Publication Data
US 2016/0261422 A1 Sep. 8, 2016

Related U.S. Application Data

(60) Provisional application No. 61/987,536, filed on May 2, 2014.

(51) Int. Cl.
*H04L 12/18* (2006.01)
*H04W 72/12* (2009.01)
(Continued)

(52) U.S. Cl.
CPC ........ *H04L 12/1863* (2013.01); *H04L 12/189* (2013.01); *H04L 12/1895* (2013.01);
(Continued)

(58) Field of Classification Search
None
See application file for complete search history.

(56) References Cited

U.S. PATENT DOCUMENTS

2005/0286483 A1* 12/2005 Lee ............... H04W 72/005
  370/345
2006/0040655 A1* 2/2006 Kim ............... H04W 76/002
  455/426.1
(Continued)

OTHER PUBLICATIONS

3GPP TS 25.446 V10.2.0 (Dec. 2011) 3rd Generation Partnership Project; Technical Specification Group Radio Access Network; MBMS Synchronisation Protocol (SYNC) (Release 10) dated Dec. 19, 2011 consisting of 22-pages.

(Continued)

*Primary Examiner* — Hassan Phillips
*Assistant Examiner* — Duc Duong
(74) *Attorney, Agent, or Firm* — Christopher & Weisberg, P.A.

(57) ABSTRACT

A method and system for preventing muting of ongoing services when a new multicast traffic channel, MTCH, is to be started or stopped are disclosed. According to one aspect, embodiments provide a method that includes sending an indication of service start to trigger sending of a multicast control channel, MCCH, update during a first MCCH modification period to inform the base station of the new MTCH to be started during a second MCCH modification period at a time determined at the base station. The method further includes sending control packet data units, PDUs, during an MCCH modification period preceding the second MCCH modification period, the PDUs arranged to avoid muting of the ongoing services.

20 Claims, 18 Drawing Sheets

(51) Int. Cl.
*H04W 72/00* (2009.01)
*H04L 29/08* (2006.01)
(52) U.S. Cl.
CPC ......... *H04L 69/322* (2013.01); *H04W 72/005* (2013.01); *H04W 72/1205* (2013.01)

(56) References Cited

U.S. PATENT DOCUMENTS

| 2006/0067361 | A1* | 3/2006 | Lee | H04W 72/005 |
| | | | | 370/466 |
| 2013/0003640 | A1* | 1/2013 | Yang | H04W 72/005 |
| | | | | 370/312 |
| 2014/0153475 | A1* | 6/2014 | Huang | H04W 4/06 |
| | | | | 370/312 |
| 2015/0078241 | A1* | 3/2015 | Xu | H04L 12/189 |
| | | | | 370/312 |
| 2015/0305037 | A1* | 10/2015 | Zhang | H04W 72/0406 |
| | | | | 370/329 |

OTHER PUBLICATIONS

3GPP TS 36.444 V11.1.0 (Mar. 2012) 3rd Generation Partnership Project; Technical Specification Group Radio Access Network; Evolved Universal Terrestrial Radio Access Networ (E-UTRAN) M3 Application Protocol (M3AP) (Release 11) dated Mar. 9, 2012 consisting of 62-pages.

3GPP TS 36.300 V10.7.0 (Mar. 2012) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) dated Mar. 12, 2012 consisting of 194-pages.

NPL1_International Search Report and Written Opinion dated Jul. 27, 2015 for International Application Serial No. PCT/IB2015/053204, International Filing Date—May 1, 2015 consisting of 12-pages.

NPL2_3GPP TSG-RAN WG RAN2 #67bis, R2-095843, Miyazaki, Japan, Agenda Item: 6.3.1, Source: Alcatel-Lucent Shanghai Bell, Alcatel-Lucent, ZTE, Title: Issues on Conservative Packet Loss in MBSFN Transmission:, Document for Discussion and Decision Oct. 12-16, 2009 consisting of 6-pages.

NPL3—3GPP TSG RAN WG3 #66 Jeju, Korea, R3-093113, Agenda Item: 13.2.2, Source: ZTE, Alcatel-Lucent Shanghai Bell, Alcatel-Lucent, CATT, China Mobile, Title "Synchronization Recovery Enhancement," Document for Discussion and Approval, Nov. 9-13, 2009, consisting of 6-pages.

NPL3—3GPP TS 36.300 V12.1.0 (Mar. 2014) 3rd Generation Partnership Project; Technical Specificaiton Group Radio Access Network; Evolved Universal Terrestrial Radio Access (E-UTRA) and Evolved Universal Terrestrial Radio Access Network (E-UTRAN); Overall Description; Stage 2 (Release 12) Mar. 19, 2014 consisting of 209-pages.

NPL5_International Search Report and Written Opinion dated Jul. 28, 2015 for International Application Serial No. PCT/IB2015/053206, International Filing Date—May 1, 2015 consisting of 13-pages.

* cited by examiner

METHOD FOR ELIMINATING MUTING DURING EVOLVED MULTICAST BROADCAST SERVICE (EMBS) SERVICE CHANGE

TECHNICAL FIELD

Wireless communications and in particular to managing evolved Multimedia Broadcast/Multicast Services (eMBMS) service changes.

BACKGROUND

In a typical cellular network, also referred to as a wireless communication system, a wireless device, such as a User Equipment (UE), communicates via a Radio Access Network (RAN) to one or more Core Networks (CNs).

A wireless device is a device by which a subscriber may access services offered by an operator's network and services outside the operator's network to which the operator's radio access network and core network provide access, e.g. access to the Internet. The wireless device may be any device, mobile or stationary, enabled to communicate over a radio channel in the communications network, for instance but not limited to, e.g., mobile phones, smart phones, sensors, meters, vehicles, household appliances, medical appliances, media players, cameras, or any type of consumer electronic, for example but not limited to televisions, radios, lighting arrangements, tablet computers, laptops or Personal Computers (PCs). The wireless device may be portable, pocket storable, hand held, computer comprised, or vehicle mounted mobile devices, enabled to communicate voice and/or data, via the radio access network, with another entity, such as another wireless device or a server.

Wireless devices are enabled to communicate wirelessly with the communications network. The communication may be performed, e.g., between two wireless devices, between a wireless device and a regular telephone and/or between the wireless device and a server via the radio access network, and possibly one or more core networks, and possibly the Internet.

The radio access network covers a geographical area which may be divided into cell areas, with each cell area being served by a base station, e.g. a Radio Base Station (RBS), which in some radio access networks is also called evolved node B (eNB), NodeB, B node or base station. A cell is a geographical area where radio coverage is provided by the base station at a base station site. The base stations communicate over the air interface with the wireless devices within range of the base stations. In the following, the term eNB may be used when referring to the base station, but the embodiments are not limited to the long term evolution (LTE) system and standards.

Multimedia Broadcast and Multicast Services (MBMS) is a broadcasting service offered via cellular networks. MBMS is a point-to-multipoint service in which data is transmitted from a single source entity to multiple recipients. MBMS may be used for file download and for streaming services, e.g., "Mobile TV".

Enhanced MBMS (eMBMS) is an enhanced version of MBMS and it is used to denominate MBMS service in Evolved Packet Systems (EPS) including E-UTRAN (LTE) and UTRAN access. E-UTRAN is defined as Evolved UMTS Terrestrial Radio Access Network, UMTS is defined as Universal Mobile Telecommunications System, LTE refers to Long Term Evolution and UTRAN refers to Universal Terrestrial Radio Access Network. The eMBMS was included in the Third Generation Partnership Project (3GPP) release 9 specifications. The eMBMS is related to using LTE to simultaneously broadcast content to multiple wireless devices. An eMBMS may, for example, be particularly useful during live events, such as music concerts or sports events, where millions of consumers are simultaneously viewing the same content, and where eMBMS may be used to broadcast complementary content, like different camera angles for instance, to LTE wireless devices. eMBMS enables operators to make better use of their available spectrum and free up network capacity. Thus, the operators may maximize efficiency when offering services such as live TV, video on demand, podcasts, etc.

One aspect of eMBMS is MBMS single frequency network (MBSFN) transmission. A MBSFN area includes multiple cells in which transmission of identical waveforms is performed at the same time. A property of MBSFN transmission is that all participating cells transmit exactly the same content in a synchronized manner so it appears as one transmission to the wireless device. This makes it possible for wireless devices to combine MBMS transmissions from multiple cells. Transmitting the same data to multiple wireless devices allows network resources to be shared. Mechanisms are therefore provided to ensure synchronization of the MBMS content, i.e., to ensure that all participating base stations include the same MBMS control information and data in the corresponding time-synchronized subframe.

To achieve the MBSFN transmission, the following synchronizations are sought:
Network synchronization;
MBMS User Data flow synchronization; and
MBMS control plane synchronization (also called MCCH Update Signaling synchronization)

MCCH refers to Multicast Control Channel and is a point-to-multipoint downlink channel used for transmitting MBMS control information from the base station to the wireless device. This channel is only used by wireless devices that receive MBMS.

The eMBMS is implemented in the third generation partnership project (3GPP) specifications by the addition of a number of new capabilities to existing functional entities of the 3GPP architecture and by addition of a new functional entity, a Multi-cell/multicast Coordination Entity (MCE). According to 3GPP, there are two eMBMS deployment alternatives:
Alternative 1: Standalone MCE, as shown in FIG. 1; and
Alternative 2: Distributed MCE, as shown in FIG. 2.

FIG. 1 is an illustration of the eMBMS logical architecture of a communications network 10 with a standalone MCE 12 in communication with two base stations 14a and 14b, referred to collectively herein as base stations 14. The communications network 10 may include an LTE core network 10a and an LTE radio access network 10b. The Broadcast Multicast Service Center (BM-SC) 16 is an entity which controls MBMS sessions and corresponding MBMS bearers. As used herein the term "bearer" is used as is known in the art and generally refers to a set of network parameters that defines data-specific treatment, i.e., defines a virtual data pipeline, for a specified type of data, e.g., voice, video, etc. The dashed lines indicate a control plane interface whereas the solid lines indicate a data plane interface.

As noted, in FIG. 1, the MCE 12 is a logical standalone entity. The functions of the MCE 12 include admission control and allocation of radio resources used by all base stations 14, e.g., eNBs, in the MBSFN area. The standalone MCE 12 is involved in MBMS Session Control Signaling. The standalone MCE 12 decides when base stations 14 perform MCCH update signaling to wireless devices (not shown). Accordingly, MCCH update signaling synchronization may be achieved. Only two base stations 14 are shown in FIG. 1 for the sake of simplicity, but the skilled person will understand that more than two base stations 14 may be included in communications network 10.

The Mobility Management Entity (MME) 18 is a control node in the communications network 10. The MBMS Gateway (MBMS GW) 20, is an entity that is logically present between the BM-SC 16 and base stations 14. The functions of the MBMS GW 20 include sending/broadcasting of MBMS packets to each base station 14 transmitting the service. The MBMS GW 20 performs MBMS Session Control Signaling (Session start/stop) towards the E-UTRAN via the MME 12. The content provider 22 provides eMBMS services to the communications network 10.

In an LTE system, interfaces M1, M2 and M3 are present as follows. The M3 interface between the MCE 12 and the MME 18 is a control plane interface as indicated by the dashed line. The M1 interface is the interface between the MBMS GW 20 and the base stations 14, and is a user plane interface as indicated by the solid line. The M2 interface is a control plane interface between the MCE 12 and the base stations 14. The IP multicast on an M1 interface is used for point-to-multipoint delivery of user packets from the MBMS GW 20 to the base stations 14.

FIG. 2 is an illustration of an eMBMS logical architecture of a communications network 24 with a distributed MCE. The communications network 24 may include an LTE core network 24a and an LTE radio access network 24b. In FIG. 2, the base station and MCE are combined in a single entity 26. Two of these entities 26a and 26b are shown, although more than two may exist in an actual communications network. In FIG. 2, the M3 interface between the MCE 18 and the base station/MCE 26 is a control interface. The M1 interface between the MBMS GW 20 and the base station/MCE 26 is a user plane interface for point-to-multipoint delivery of user packets from the MBMS GW 20 to the base station/MCE 26.

Returning to FIG. 1, whenever the MCE 12 updates the control information, the MCE 12 indicates the modification period from which the updated control information applies by means of a parameter called MCCH update time. This concept is used in the distributed MCE architecture to synchronize control plane signaling. In particular, the MCCH update signaling for all base stations 14 is sent by sending the same MCCH update time to all base stations 14. Hence, the synchronization of the MCCH update signaling for all base stations 14 may be achieved. The range of the MCCH update time is 0-255, which is the number of MCCH modification periods elapsed since global positioning system (GPS) time 0, modulo 256.

The 3GPP standard supports control plane synchronization for the distributed MCE architecture of FIG. 2 by including the parameters "Time of MBMS Data Transfer" and "Time of MBMS Data Stop" in the MBMS session start request and the MBMS session stop request messages, respectively. The "Time of MBMS Data Transfer" and the "Time of MBMS Data Stop" are absolute timestamps which indicate the absolute time of the actual start or stop of the MBMS data transfer. Accordingly, all base stations/MCE 26 will transfer/stop user data at the same time.

Even though the 3GPP defines methods to synchronize sending of user plane data PDUs using M1 SYNC protocol and synchronize sending of MCCH control information using MCCH update time, possible muting, i.e., non-transmission of data, of ongoing services is inevitable during service addition or deletion. The MCE derives the MCCH update time and sends the MCCH update time to all base stations 14 as part of M2 scheduling messages. In present systems, the MBMS SESSION START REQUEST and the MBMS SESSION STOP REQUEST messages do not indicate when the M1 message is going to start or stop.

FIG. 3 is a timing diagram where muting occurs when starting a new MBMS service. Assume that a first service denoted as multicast traffic channel 1 (MTCH1) is ongoing when an operator wants to create a second service (MTCH2). The second service is going to be mapped to the same multicast channel (MCH) as the first service. The second service starts at a multicast control channel (MCCH) modification time period Y+1. The possible start time for the new service MTCH2 is anywhere during the MCCH modification time period Y+1. Two possible MTCH start times T1 and T2 during this modification time period are shown.

Regardless of when during the MCCH modification time period Y+1 the second service starts, the MCCH carrying the updated control information must be sent during the MCCH modification time period Y. When this occurs, the base station expects to send multicast scheduling information (MSI) at time x, (MSI(x)) with information for the second service. A Stop MTCH value for the second service is needed by the base station when building the information MSI(x). If synchronization packet data units (SYNC PDUs type 3) for the second service are not received by the base station in time for building the MSI(x), the base station will mute the ongoing services.

An explanation of a cause of this muting is as follows. The BM-SC is not aware of the base station MCCH boundaries and the second service may start at any time during MCCH modification time period Y+1. In order to minimize delay, sync PDU packets need to be received at the base station just before building a corresponding MSI(x). In this case, the first SYNC PDUs for MTCH 2 will arrive at multicast scheduling period (MSP) (x−1) for possible start time T1 and at MSP(x+2) for possible start time T2, where there are four MSPs for each MCCH modification time period in the example of FIG. 2. Thus, for possible start time T2, the base station will not receive any SYNC PDUs for the second service when building MSI(x). In this case, the base station does not know whether the base station did not receive the SYNCH PDUs corresponding to MTCH2 due to transport network failure, delayed packet arrival or other valid reason for muting, or due to not receiving data for MTCH2 because the service has not started yet. Accordingly, the base station mutes the MCH during the MSPs (x), (x+1) and (x+2) of the MCCH modification time period (Y+1), when the start time for MTCH2 is at time T2. This muting causes an unsatisfactory user experience, since service on the MCH is detectably interrupted.

FIG. 4 is a timing diagram where muting occurs when stopping an ongoing MBMS. Assume that two services, MTCH1 and MTCH2, are ongoing simultaneously, and the operator wants to stop the second service, MTCH2. The second service is going to be stopped during MCCH modification time period (Y). The possible stop time for the second MTCH2 could be closer to the MCCH modification period start boundary (T3) or could be closer to the end boundary (T4). Regardless of the stop time, the second service MTCH2 can only be removed from the MCCH at MCCH modification time period (Y+1). Thus, the MCCH update for MTCH2 is sent during the MCCH modification time period (Y+1). In this case, the base station expects to send multicast scheduling information MSI(x), MSI(x+1), MSI(x+2) and MSI(x+3) with information about MTCH2. The stop MTCH value for the second service must be known when building these MSIs. If the SYNC PDUs corresponding to the second service are not received by the base station before building the MSIs, the base station mutes the ongoing services of the MCH, even though all of the SYNC PDUs for the first service are received in time.

The BM-SC does not know when the MCCH boundaries of the base station occur and the service MTCH2 can stop at any time during the first MCCH modification time period (Y). When the second service MTCH2 is stopped, the BM-SC will not send any corresponding SYNC PDUs. So, for possible stop time T3, the base station will not receive any SYNC PDUs when building the MSIs. The base station does not know whether the lack of receipt of the SYNC PDUs is due to transport network failure or other valid reason for muting, or because the service has stopped. As a consequence, the MCH is muted during the MSPs in MCCH modification time period (Y) starting with MSI(x+1), when the stop time for the MTCH2 is at time T3. This muting causes an unsatisfactory user experience, since service on the MCH is detectably interrupted.

SUMMARY

The present invention advantageously provides a method and system for preventing muting of ongoing services of a multimedia broadcast and multicast service, MBMS, in a wireless communication network having a base station during multicast scheduling periods, MSPs, when a new multicast traffic channel, MTCH, is to be started. According to one aspect, embodiments provide a method that includes sending an indication of service start to trigger sending of a multicast control channel, MCCH, update during a first MCCH modification period to inform the base station of the new MTCH to be started during a second MCCH modification period at a time determined at the base station. The method further includes sending control packet data units, PDUs, during an MCCH modification period preceding the second MCCH modification period, the PDUs arranged to avoid muting of the ongoing services.

According to this aspect, in some embodiments, at least one of the control PDUs is a SYNC PDU type 3 that indicates that there is no data to send for the MTCH to be started. In some embodiments, the indication that there is no data to send is a Stop MTCH value of 2047 In some embodiments, the control PDUs are transmitted to the base station on an M1 interface. In some embodiments, the indication of service start is sent to a multicell-multicast coordination entity, MCE, separate from the base station, the MCE performing admission control and radio resource allocation for a plurality of base stations in the wireless communication network.

According to another aspect, embodiments provide a method of preventing muting of ongoing services of a multimedia broadcast and multicast service, MBMS, in a wireless communication network having a base station during multicast scheduling periods, MSPs, when an existing multicast traffic channel, MTCH, is to be stopped. The method includes sending an indication of service stop to trigger sending of a multicast control channel, MCCH, update during a first MCCH modification period to inform the base station of the existing MTCH to be stopped during a second MCCH modification period at a time determined at the base station. The method further includes sending control packet data units, PDUs, during an MCCH modification period following the first MCCH modification period, the PDUs arranged to avoid muting of the ongoing services.

According to this aspect, in some embodiments, at least one of the control PDUs is a SYNC PDU type 3 that indicates that there is no data to send for the existing MTCH to be stopped. In some embodiments, the indication that there is no data to send is a Stop MTCH value of 2047. In some embodiments, the control PDUs are transmitted to the base station on an M1 interface. In some embodiments, the indication of service stop is sent to a multicell-multicast coordination entity, MCE, separate from the base station, the MCE performing admission control and radio resource allocation for a plurality of base stations in the wireless communication network.

According to yet another aspect, embodiments include a broadcast-multicast service center, BM-SC, configured to signal a base station to prevent muting of ongoing services of a multimedia broadcast and multicast service, MBMS, in a wireless communication network during multicast scheduling periods, MSPs, when a new multicast traffic channel, MTCH, is to be started. The BM-SC includes a processor and a memory. The memory contains executable computer instructions, that when executed by the processor, configure the processor to: send an indication of service start to trigger a multicast control channel, MCCH, update during a first MCCH modification period to inform the base station of the new MTCH to be started during a second MCCH modification period at a time determined at the base station; and send control packet data units, PDUs, during an MCCH modification period preceding the second MCCH modification period, the PDUs arranged to avoid muting of the ongoing services.

According to this aspect, in some embodiments, at least one of the control PDUs is a SYNC PDU type 3 that indicates that there is no data to send for the MTCH service to be started. In some embodiments, the one of the control PDUs causes generation of a Stop MTCH value of 2047. In some embodiments, an MCCH update is sent by a multicell/multicast coordination entity, MCE, to the base station on an M2 interface.

According to a further aspect, some embodiments include a broadcast-multicast service center, BM-SC, configured to signal a base station to prevent muting of ongoing services of a multimedia broadcast and multicast service, MBMS, in a wireless communication network during multicast scheduling periods, MSPs, when an existing multicast traffic channel, MTCH, is to be stopped. The BM-SC includes a processor and a memory. The memory contains executable computer instructions, that when executed by the processor, configure the processor to: send an indication of service stop to trigger a multicast control channel, MCCH, update during the first modification period to inform the base station of the existing MTCH to be stopped during a second MCCH modification period at a time determined at the base station; and send control packet data units, PDUs, during an MCCH modification period following the first MCCH modification period, the PDUs arranged to avoid muting of the ongoing services.

According to this aspect, in some embodiments, at least one of the control PDUs is a SYNC PDU type 3 that indicates that there is no data to send for the MTCH service to be stopped. In some embodiments, the one of the control PDUs causes generation of a Stop MTCH value of 2047. In some embodiments, an MCCH update is sent by a multicell/multicast coordination entity, MCE, to the base station on an M2 interface.

According to another aspect, embodiments include a broadcast-multicast service center, BM-SC, configured to signal a base station to prevent muting of ongoing services of a multimedia broadcast and multicast service, MBMS, in a wireless communication network during multicast scheduling periods, MSPs, when a new multicast traffic channel, MTCH, is to be started. The BM-SC includes a service start/stop module configured to indicate a service start to trigger generation of a multicast control channel, MCCH, update during a first MCCH modification period to inform the base station of the new MTCH to be started during a second MCCH modification period at a time determined at the base station. The BM-SC further includes a control packet data unit, PDU, module configured to generate and send PDUs during an MCCH modification period preceding the second MCCH modification period, the PDUs arranged to avoid muting of the ongoing services.

According to yet another aspect, embodiments include a broadcast-multicast service center, BM-SC, configured to signal a base station to prevent muting of ongoing services of a multimedia broadcast and multicast service, MBMS, in a wireless communication network during multicast scheduling periods, MSPs, when an existing multicast traffic channel, MTCH, is to be stopped. The BM-SC includes a service start/stop module configured to indicate a service stop to trigger generation of a multicast control channel, MCCH, update during a first modification period to inform the base station of the existing MTCH to be stopped during a second MCCH modification period at a time determined at the base station. The BM-SC also includes a control packet data unit, PDUs, module configured to send PDUs during an MCCH modification period following the first MCCH modification period, the PDUs arranged to avoid muting of the ongoing services.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
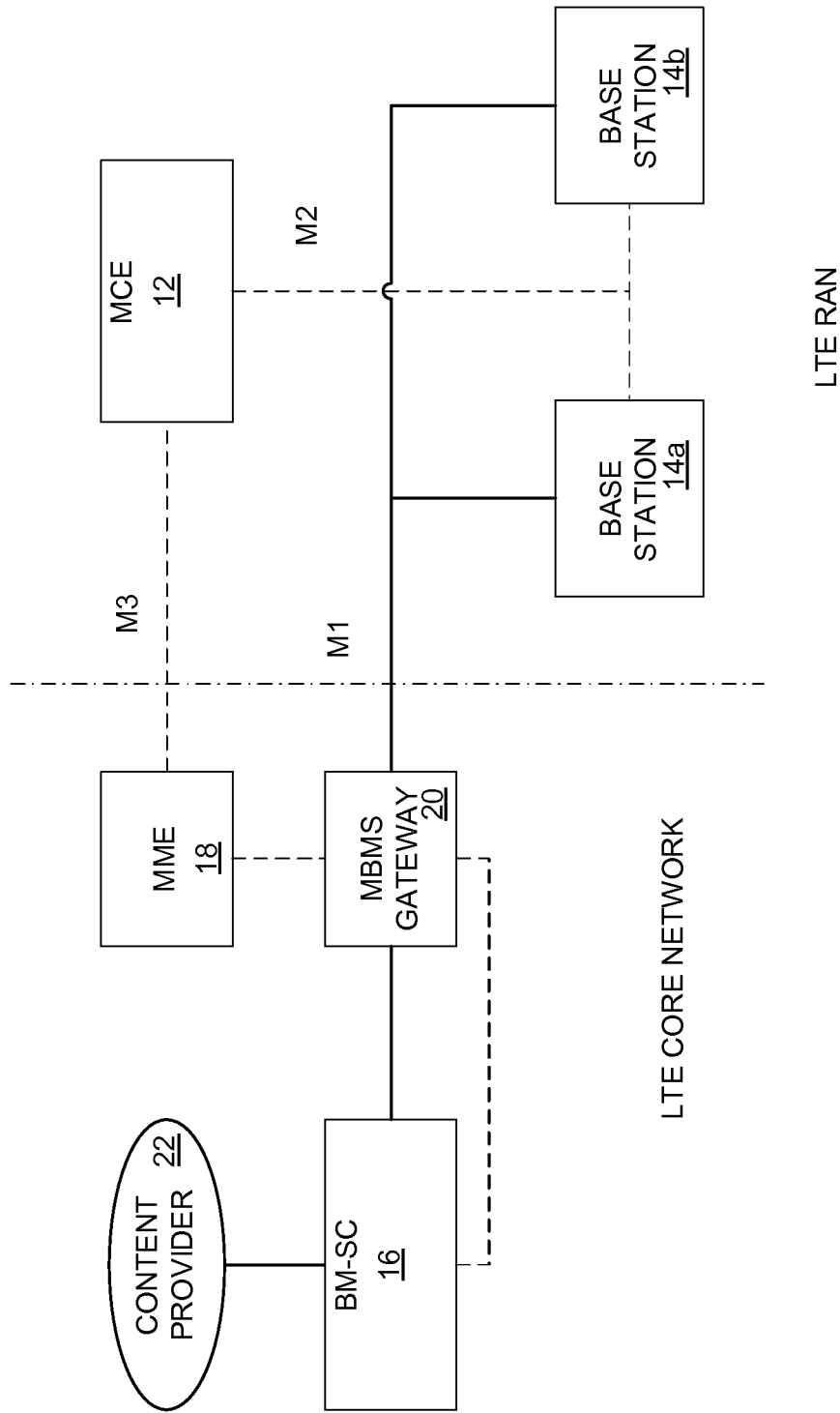
FIG. 1 is a diagram of a known communication network having a standalone MCE that provides MBMS.
Figure 2:
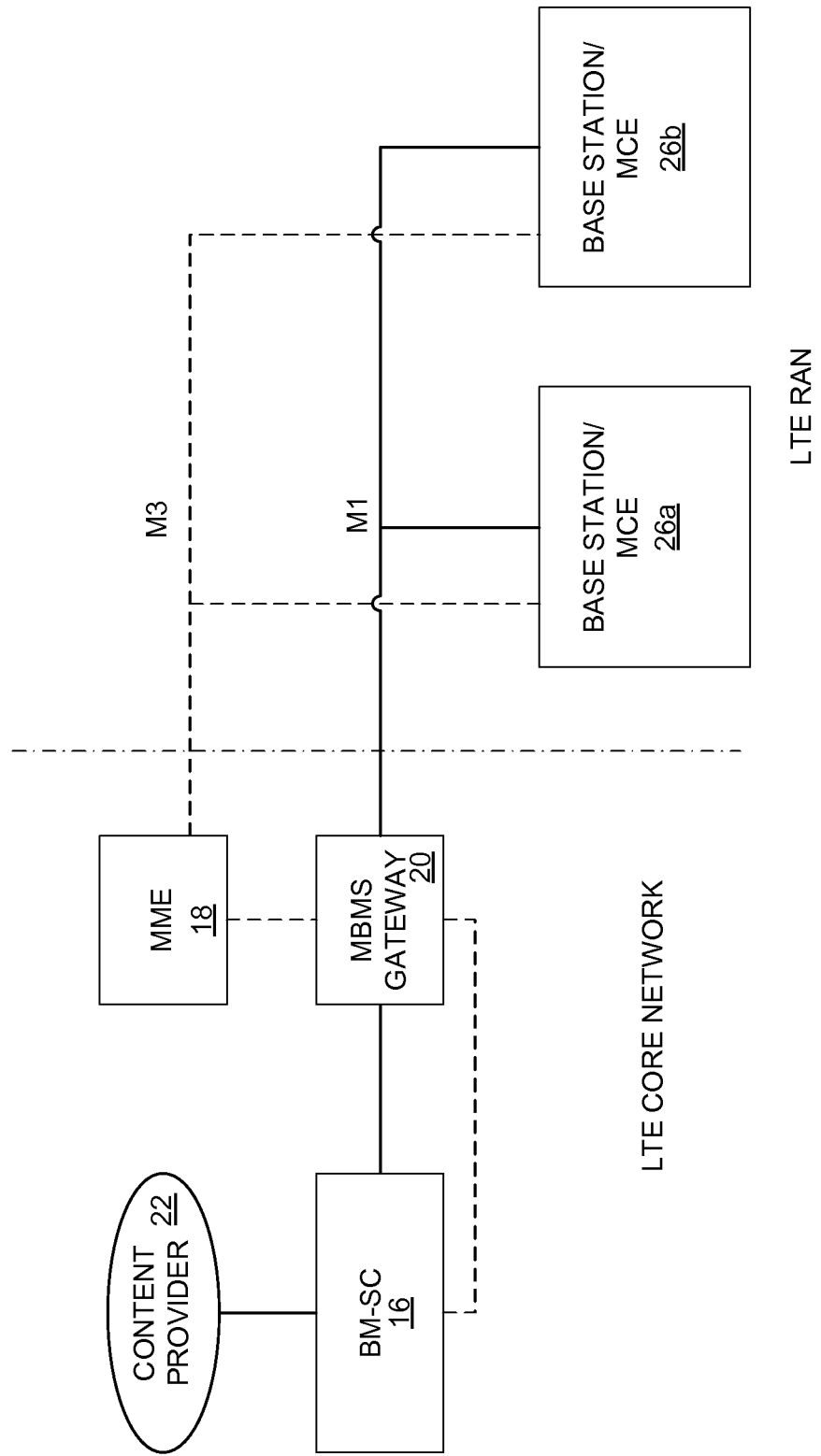
FIG. 2 is a diagram of a known communication network having a distributed MCE that provides MBMS.

Before describing in detail exemplary embodiments that are in accordance with the present invention, it is noted that the embodiments reside primarily in combinations of apparatus components and processing steps related to prevention of muting in a MSMB service. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein coordinate the sending of SYNC PDUs type 3 over an interface such as an M1 interface between an MBMS GW and a base station during service addition and deletion in such a way that there is no muting of ongoing services of a multi-cast channel (MCH).

In a first embodiment, a control PDU type 3 is sent initially at least one MCCH modification time period prior to "Time of MBMS Data Transfer" when adding a new service.

In a second embodiment, a control PDU type 3 continues to be sent one MCCH modification time period after the "Time of MBMS Data Stop" when deleting an ongoing service.

In a third embodiment, the BM-SC is mandated to start the new service at an absolute start time that coincides with a nearest earlier radio frame boundary such as a nearest earlier 1024 radio frame boundary, which shifts the absolute stop time by the same amount of time. Since there are two possible values for the MCCH update time, 512 radio frames (512 rf) and 1024 rf, one embodiment uses 1024 rf for the MCCH update time at the BM-SC regardless of the MCCH configuration for the corresponding service.

In a fourth embodiment, in addition to the MCCH update time, additional offset values are sent in a message on the M2 interface indicating when each service is supposed to start or stop.

By implementing embodiments described herein, services may be stopped or started without undesirable muting of multicast scheduling information and service data transmitted on the MTCH, thereby improving user experience.

Figure 5:
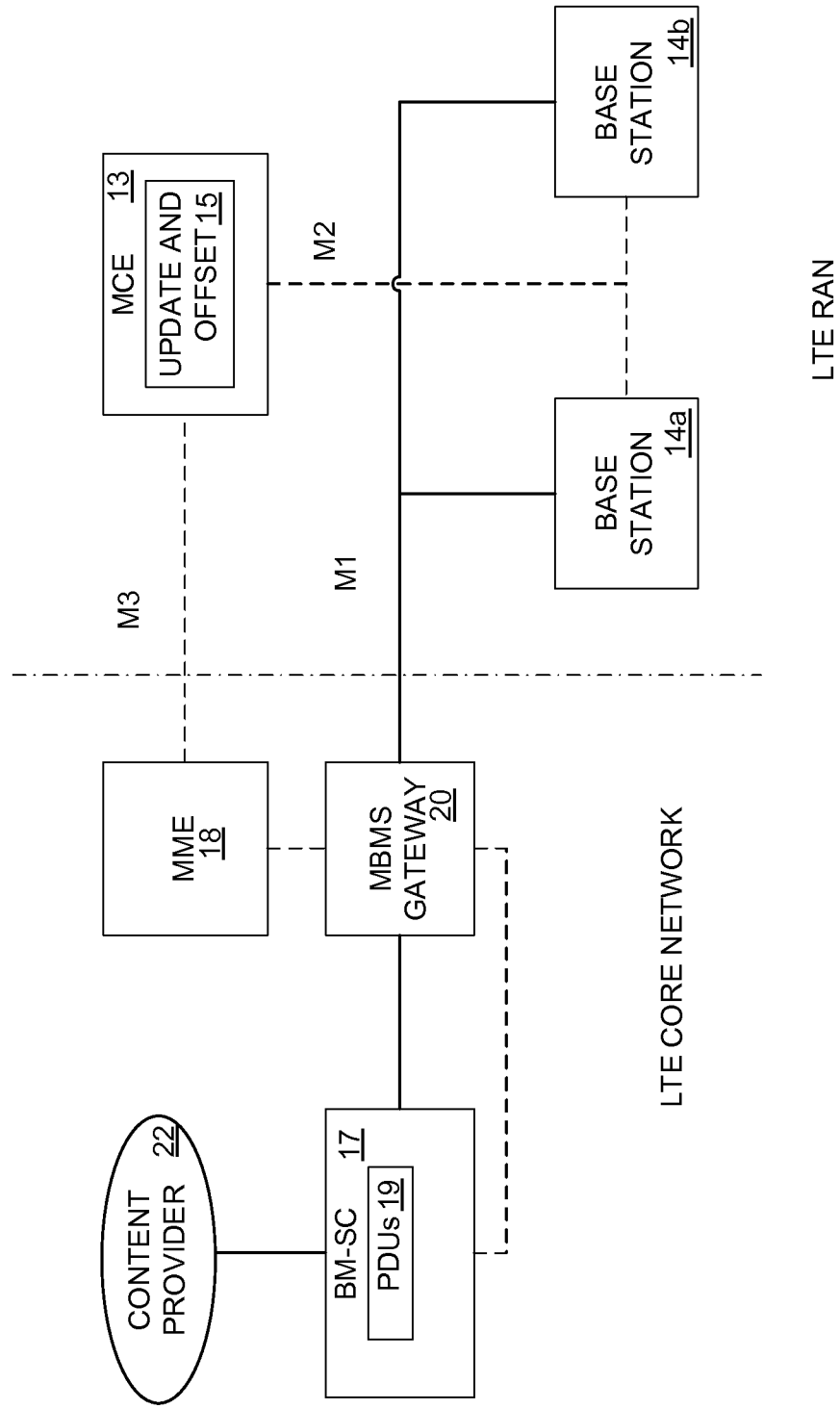
FIG. 5 is a diagram of a communication network with a standalone MCE constructed to avoid muting of MBMS when a service is started or stopped.

FIG. 5 is a block diagram of a communication network with a standalone MCE constructed to avoid muting of MBMS when a service is started or stopped. As will be explained in more detail below, a MCE 13 is equipped with an MCCH update generator and offset determiner 15 to generate an MCCH update in response to an indication of service start/stop sent from a BM-SC 17 and to calculate an offset when implementing the fourth embodiment. The BM-SC 17 is equipped with a PDU generator 19 to generate SYNC PDUs type 3 that are sent to the base stations to enable the base stations to distinguish between a network fault and a start or stop of a new service. MCE 13 and BM-SC 17 constructed in accordance with the principles of the present disclosure are described in detail below. The MCCH update generator and offset determiner 15 correspond to the MCCH update generator module 50 and the MCCH offset generator module 52 shown in FIG. 8 and is shown in FIG. 5 as a single element (15) for the sake of simplicity.

Figure 6:
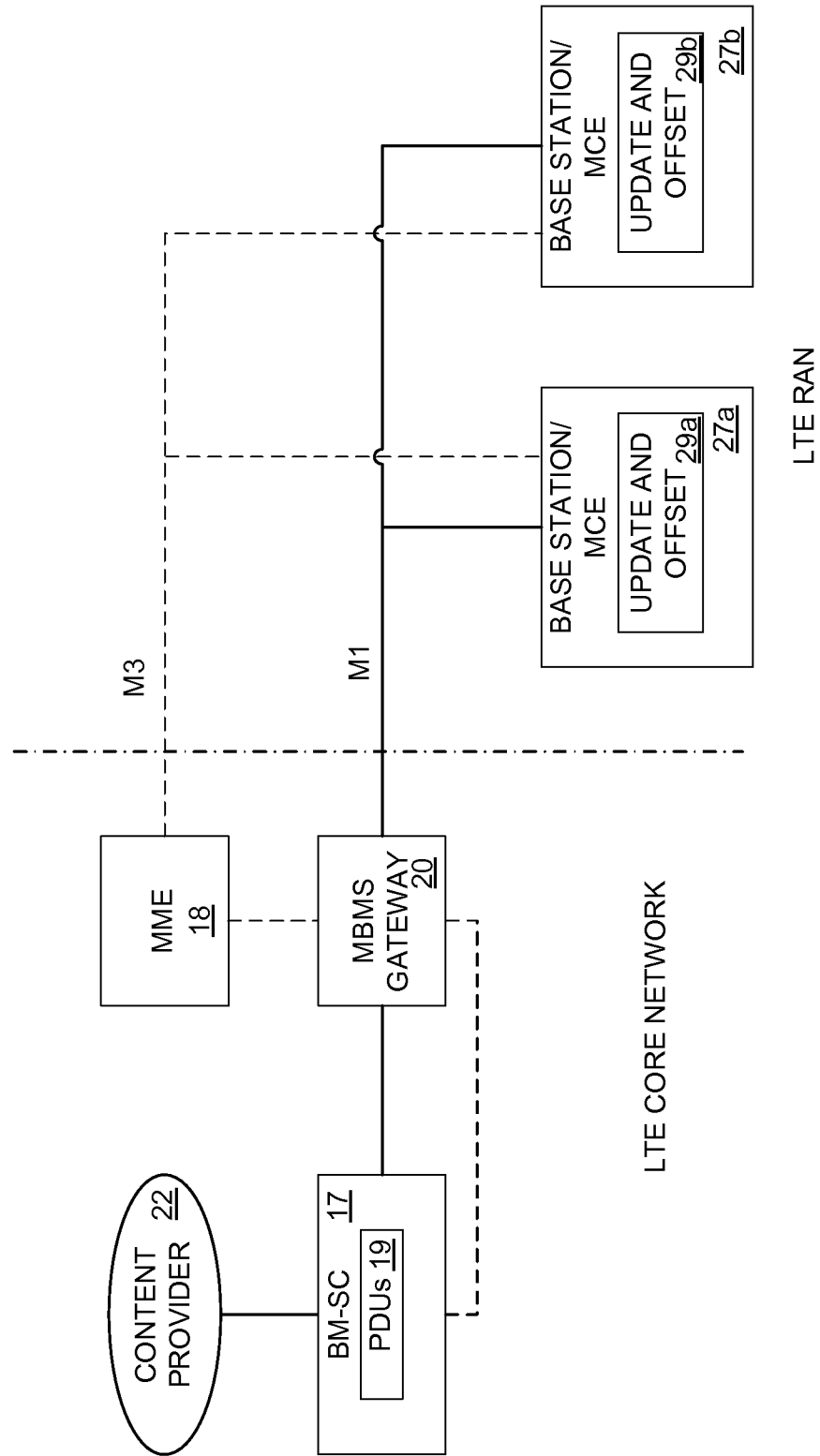
FIG. 6 is a diagram of a communication network with a distributed MCE constructed to avoid muting of MBMS when a service is started or stopped.

FIG. 6 is a block diagram of a communication network with a distributed MCE constructed to avoid muting of MBMS when a service is started or stopped. The combined base station/MCE 27a and 27b are referred to collectively herein as base stations/MCEs 27. Each base station/MCE 27a and 27b is equipped with an MCCH update generator and offset determiner 29a and 29b, respectively. These are referred to collectively as MCCH update generators and offset determiners, 29. The MCCH update generator and offset determiner 29 correspond to the MCCH update generator module 50 and the MCCH offset generator module 52 shown in FIG. 8 and is shown in FIG. 6 as a single element (29) for the sake of simplicity.

Figure 7:
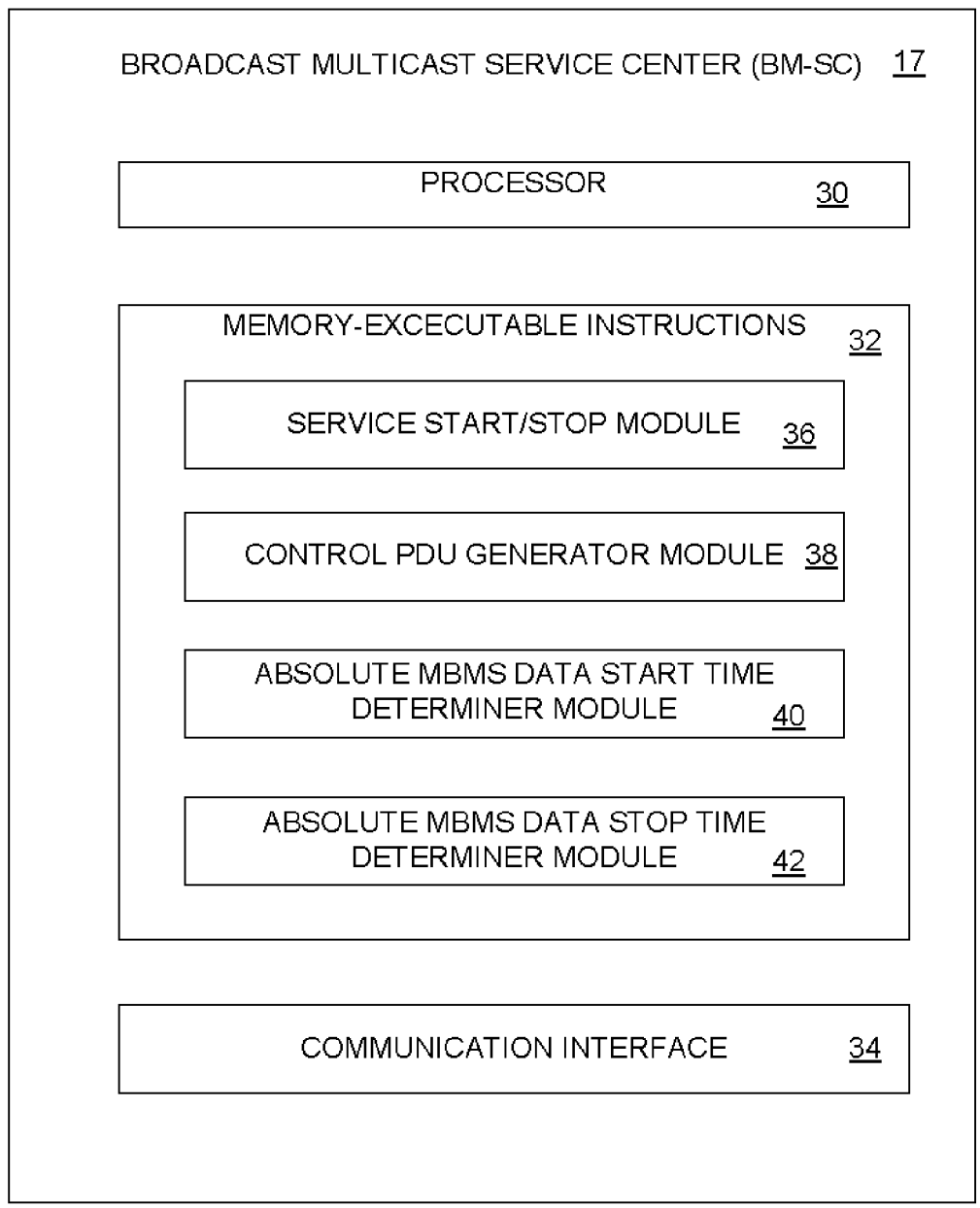
FIG. 7 is a block diagram of an embodiment of a broadcast multicast service center (BM-SC)

FIG. 7 is a block diagram of an embodiment of a BM-SC 17. The BM-SC 17 includes a processor 30, a memory 32, and a communication interface 34. The memory 32 has executable computer instructions that, when executed by the processor 30, configure the processor 30 to perform the functions described herein. In particular, executable computer instructions include a service start/stop module 36 to cause the processor 30 to send a service stop/start indication to trigger an MCCH update to be generated and sent by the MCE 13. The executable computer instructions include a control PDU generator module 38 to cause the processor 30 to generate SYNC PDUs type 3 to be sent to the base station 14. The communication interface 34 transmits the service start/stop indication to the MCE 12 and transmits the SYNC PDUs type 3 to the base station 14 or the base station/MCE 27.

To implement the third embodiment described above, the BM-SC 17 may also use an absolute MBMS data start time determiner 40 to calculate an absolute MBMS data start time. The BM-SC 17 may also use an absolute MBMS data stop time determiner 42 to calculate an absolute MBMS data stop time.

Figure 8:
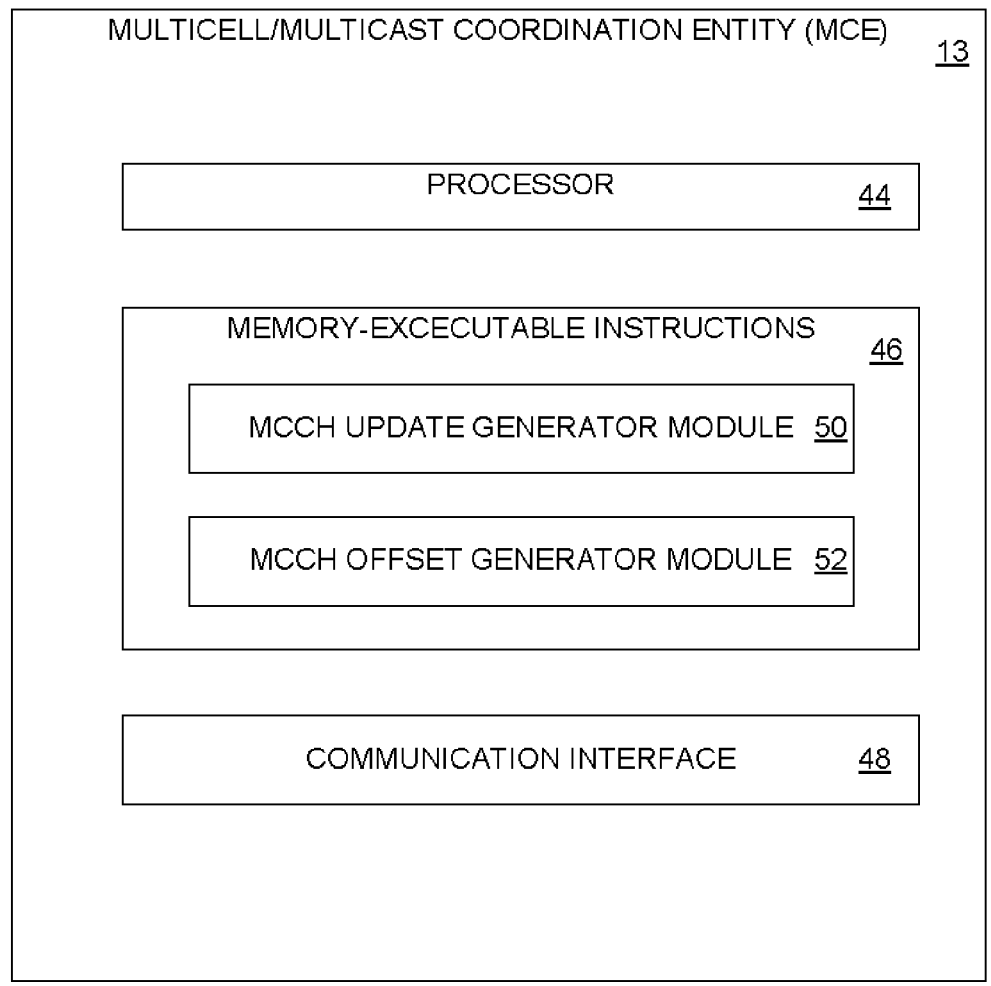
FIG. 8 is a block diagram of an embodiment of an MCE.

FIG. 8 is a block diagram of an embodiment of an MCE 13. The MCE 13 includes a processor 44, a memory 46 and a communication interface 48. The memory 46 has executable computer instructions that, when executed by the processor 44, configure the processor 44 to perform some of the functions described above. In particular, the executable computer instructions include an MCCH update generator module 50 that causes the processor 44 to generate an MCCH update as described below, and may further include an MCCH offset generator module 52 to cause the processor 40 to generate an MCCH offset as described below with reference to the fourth embodiment. The communication interface 48 transmits the MCCH update and the MCCH offset to the base station 14. In another embodiment, the functionality described with respect to FIG. 7 can be incorporated in the base station/MCE 27.

Figure 3:
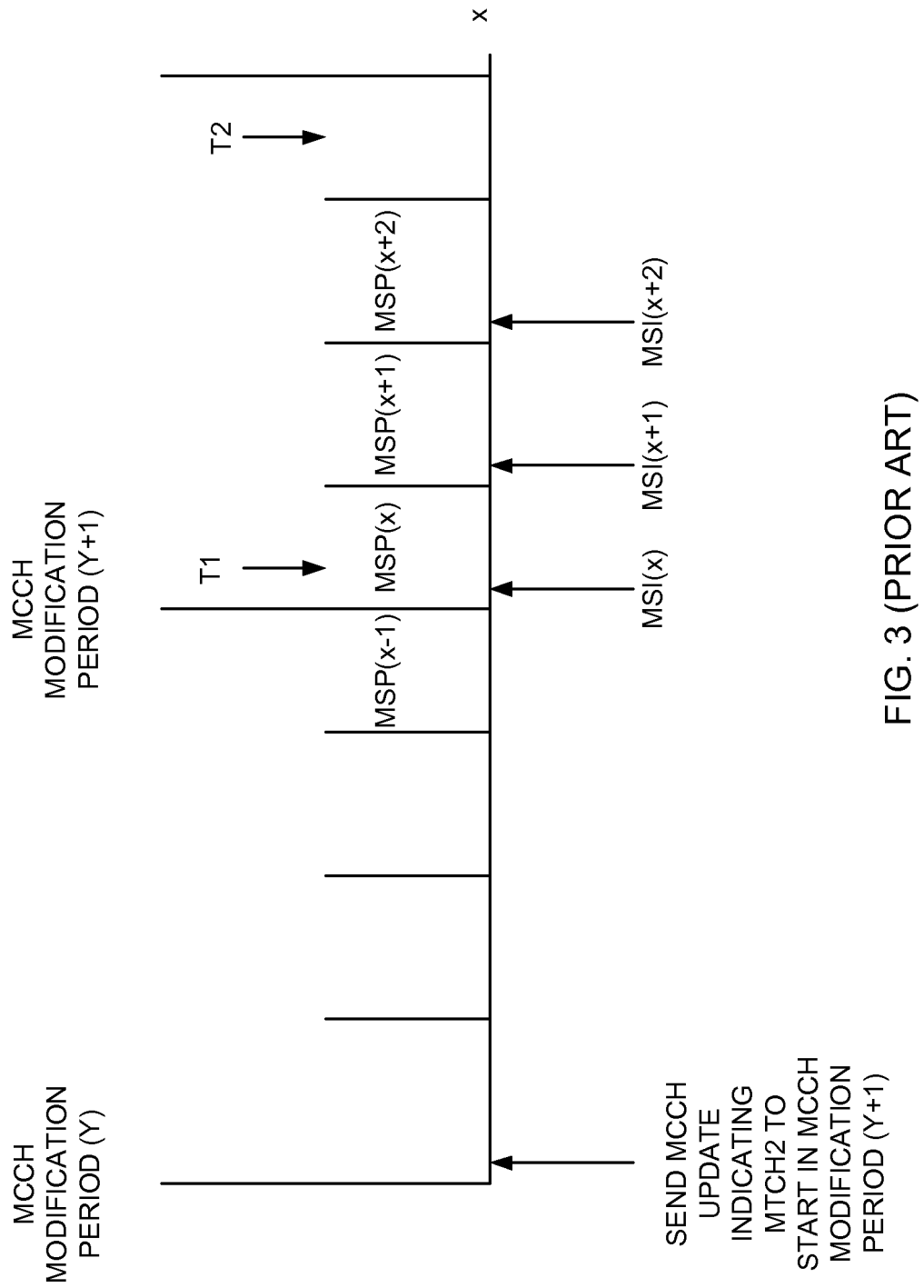
FIG. 3 is a timing diagram of known systems where muting occurs when starting a new service.
Figure 9:
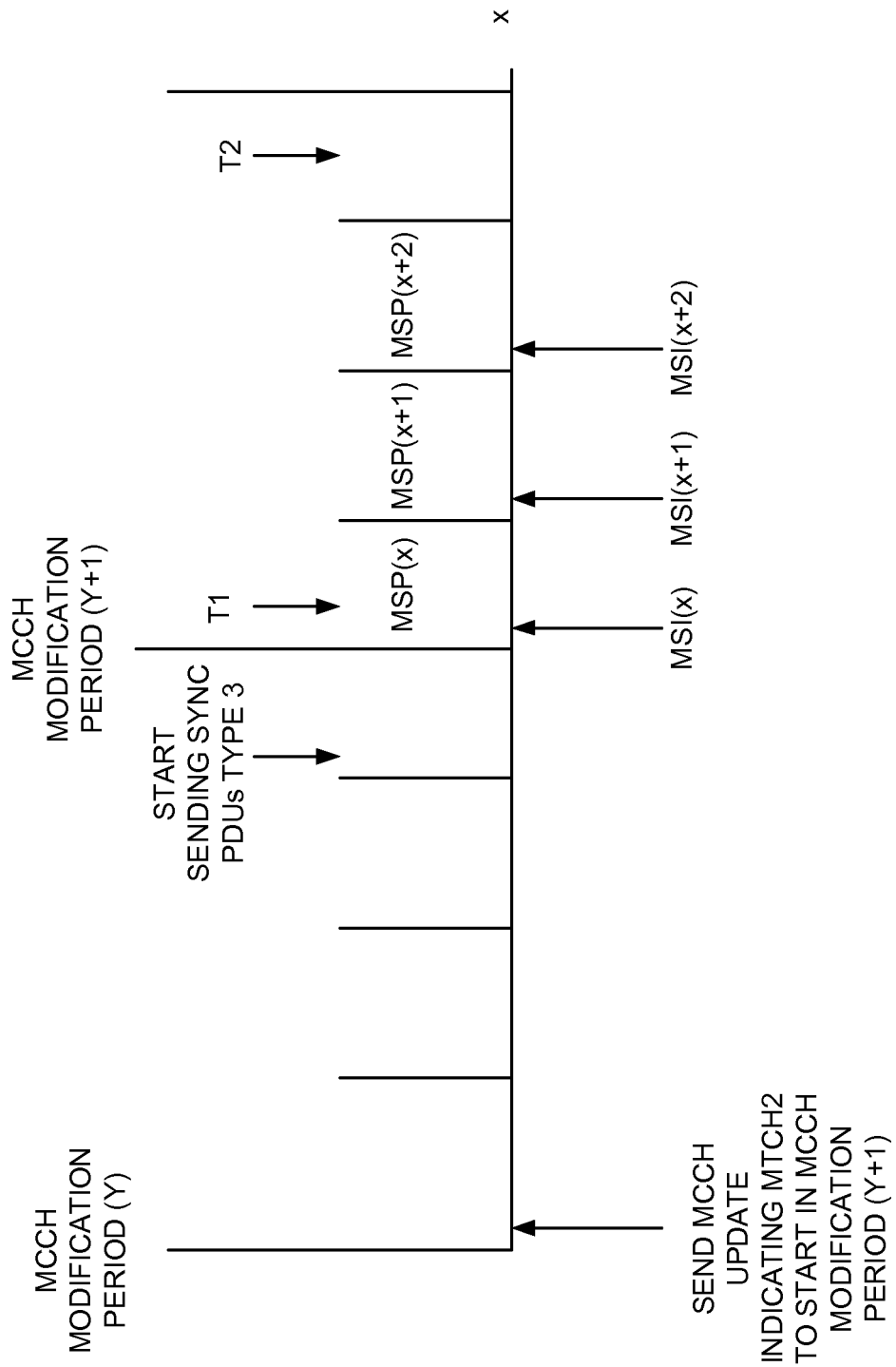
FIG. 9 is a timing diagram according to a first embodiment where muting is avoided when starting a new service.

FIG. 9 is a timing diagram for the first embodiment, where the x-axis is time. In FIG. 9, an MCCH update is sent from the MCE 13 to a base station 14 on the M2 interface, or an MCCH update trigger is sent from an MME 18 to a base station/MCE 27 on the M3 interface. The MCCH update is sent at the beginning of the MCCH modification time period (Y). The MCCH update indicates that a second service, MTCH2 is to start in MCCH modification time period (Y+1). The possible start time for starting the second service MTCH2 may be any time during the MCCH modification time period (Y+1). As noted above with reference to FIG. 3, in a conventional system, the first SYNC PDU corresponding to MTCH2 will arrive at MSP(x−1) for possible start time T1 and will arrive at MSP(x+2) for possible start time T2. Since the SYNC PDUs must be received by the base station in time to build MSI(x), MSI(x+1) and MSI(x+2), SYNC PDUs arriving at MSP(x+2) will be too late, and muting of the MCH corresponding to these MSIs will occur. To avoid this, the BM-SC 17 is configured to send SYNC PDUs type 3 corresponding to MTCH2 at a time starting 1024 radio frames (1024 rf) preceding an absolute start time of the new service. This avoids muting as follows. As shown in FIG. 8, SYNC PDUs type 3 for start time T2 begin in MCCH modification time period (Y). In this way, the SYNC PDUs type 3 corresponding to MTCH2 are sent to arrive before the building of MSI(x). This informs the base station 14 or the base station/MCE 27 that there is no data to send for the second service until after MSP(x+2). Thus, the base station 14 will build the MSIs for x, x+1 and x+2 by assigning a Stop MTCH value of 2047 to indicate that there is not data to send. Muting will not occur since the base station did receive the SYNC PDUs type 3 corresponding to the second service in time to build the MSIs for MCCH modification time period (Y+1).

Thus, the first embodiment prevents muting of ongoing services of an MBMS in a wireless communication network during multicast scheduling periods (MSP) when a new MTCH is to be started. A BM-SC 17 sends an information element indicating the start of a new service to the MCE 13 or the MCE of the base station/MCE 27. Since the new service is being added to a preexisting service on the same MCH, the MCE sends an MCCH update during a first MCCH modification time period to inform a base station of the new MTCH to be started during a second MCCH modification time period at a time determined at the base station. The BM-SC 17 sends control PDUs starting 1024 rf before the absolute start time of the new service, the PDUs arranged to avoid muting of the ongoing services. The control PDUs may be sent to the base station on an M1 interface. The information elements indicating a start of the new service may be sent to the MCE 13 or the MCE of the base station/MCE 27 via an M3 interface. The MCE 13 sends the MCCH update to the base station on an M2 interface when the MCE is a standalone unit.

Figure 4:
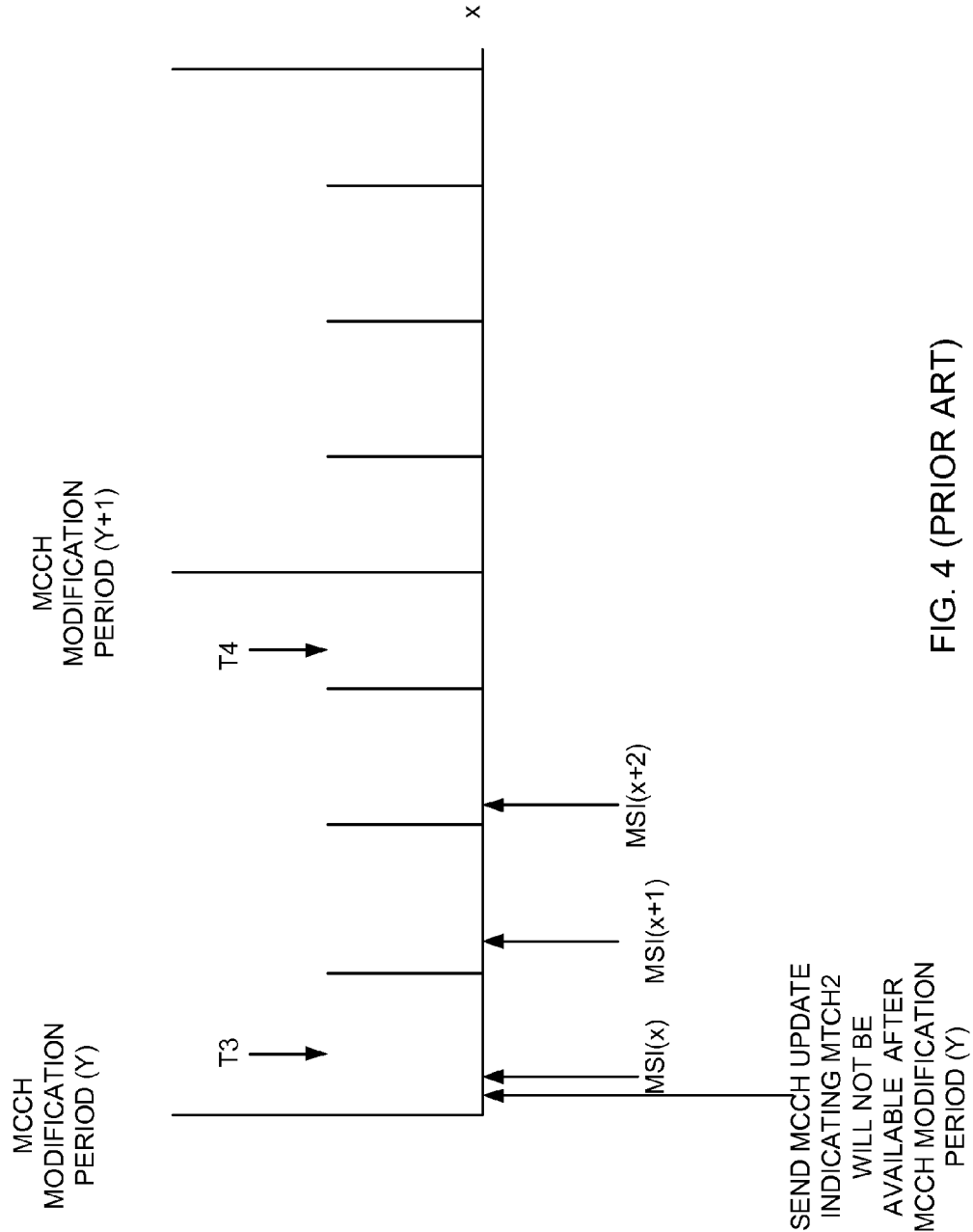
FIG. 4 is a timing diagram of known systems where muting occurs when stopping an ongoing service.
Figure 10:
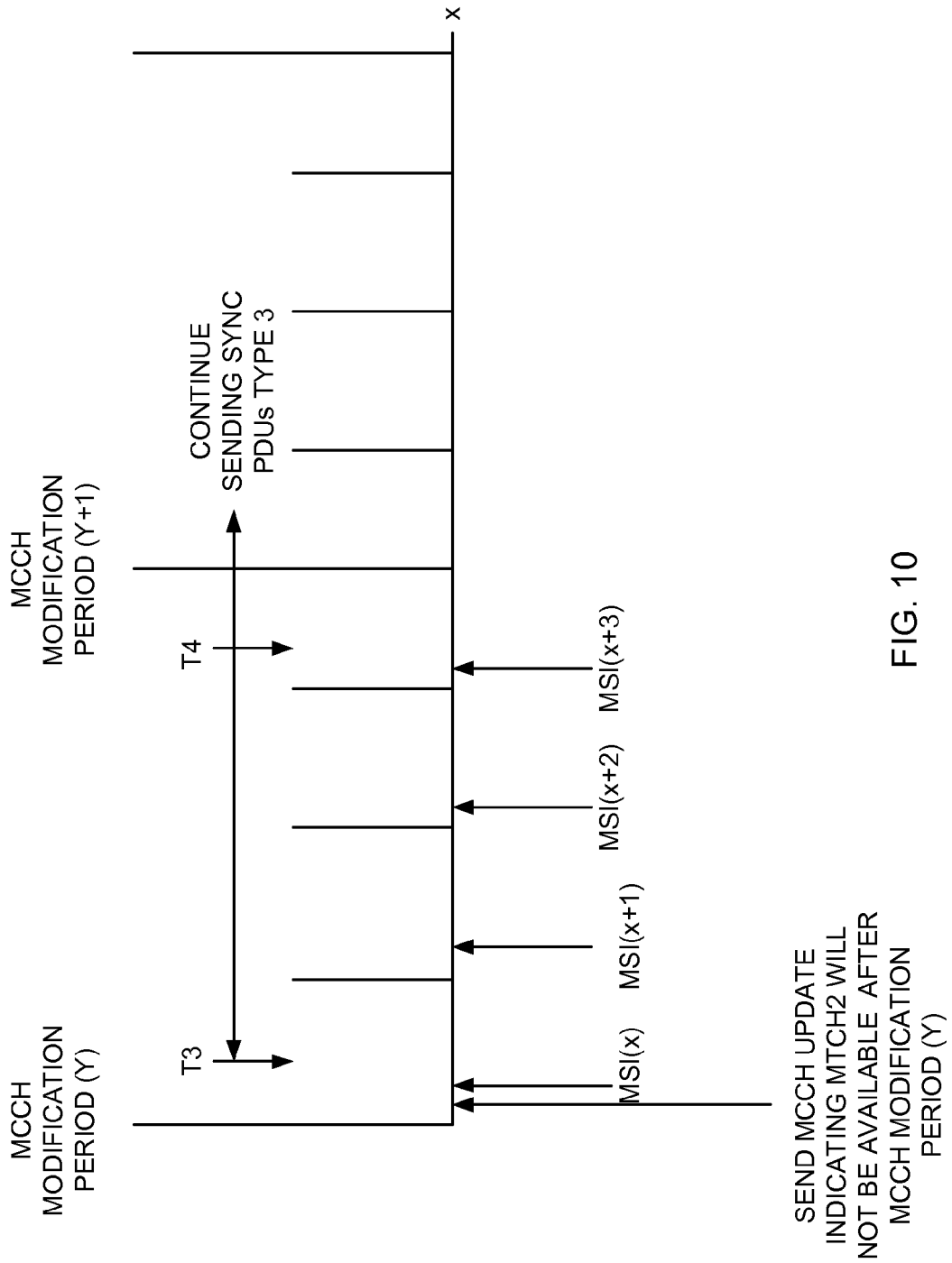
FIG. 10 is a timing diagram according to a second embodiment where muting is avoided when stopping an ongoing service.

FIG. 10 is a timing diagram for the second embodiment. In FIG. 10, an MCCH update is sent from the MCE 13 to a base station 14 on the M2 interface or an MCCH update trigger is sent from an MME 18 to a base station/MCE 27 on the M3 interface. The MCCH update is sent at the beginning of the MCCH modification time period (Y). The MCCH update indicates that the second service, MTCH2, will not be available after MCCH modification time period (Y) for the event that the service is stopped in MCCH modification time period (Y). The he BM-SC 17 does not know when the MCCH modification boundaries start and stop and the service may stop at any time during the MCCH modification time period (Y). As noted above with reference to FIG. 4, in a conventional system, if the second service stops at time T3, no SYNC PDUs will be received for MSIs x+1, x+2 and x+3. Consequently, the MCH during these periods will be muted. To avoid this, the BM-SC 17 is configured to continue sending SYNC PDUs type 3 for 1024 rf after the absolute stop time of the service to be stopped. Thus, the base station will build the MSIs for x+1, x+2, x+3, by assigning a Stop MTCH value of 2047 indicating that there is no data to send for the MTCH2. Muting will not occur since the base station did receive the SYNC PDUs type 3 corresponding to the stop time T3 in time to build the MSI for MCCH modification time period (Y).

Thus, the second embodiment prevents muting of ongoing services of an MBMS in a wireless communication network during multicast scheduling periods (MSP) when a new MTCH is to be stopped. A BM-SC 17 sends an information element indicating the stop of an ongoing service to the MCE 13 or the MCE of the base station/MCE 27. Since the service to be stopped is one of a plurality of services on the same MCH, the MCE sends an MCCH update during a first MCCH modification time period to inform the base station of the existing MTCH to be stopped during the first MCCH modification time period at a time determined at the base station. The BM-SC 17 sends SYNC PDUs type 3 for 1024 rf after the absolute stop time of the service to be stopped, the SYNC PDUs type 3 arranged to avoid muting of the ongoing services.

Figure 11:
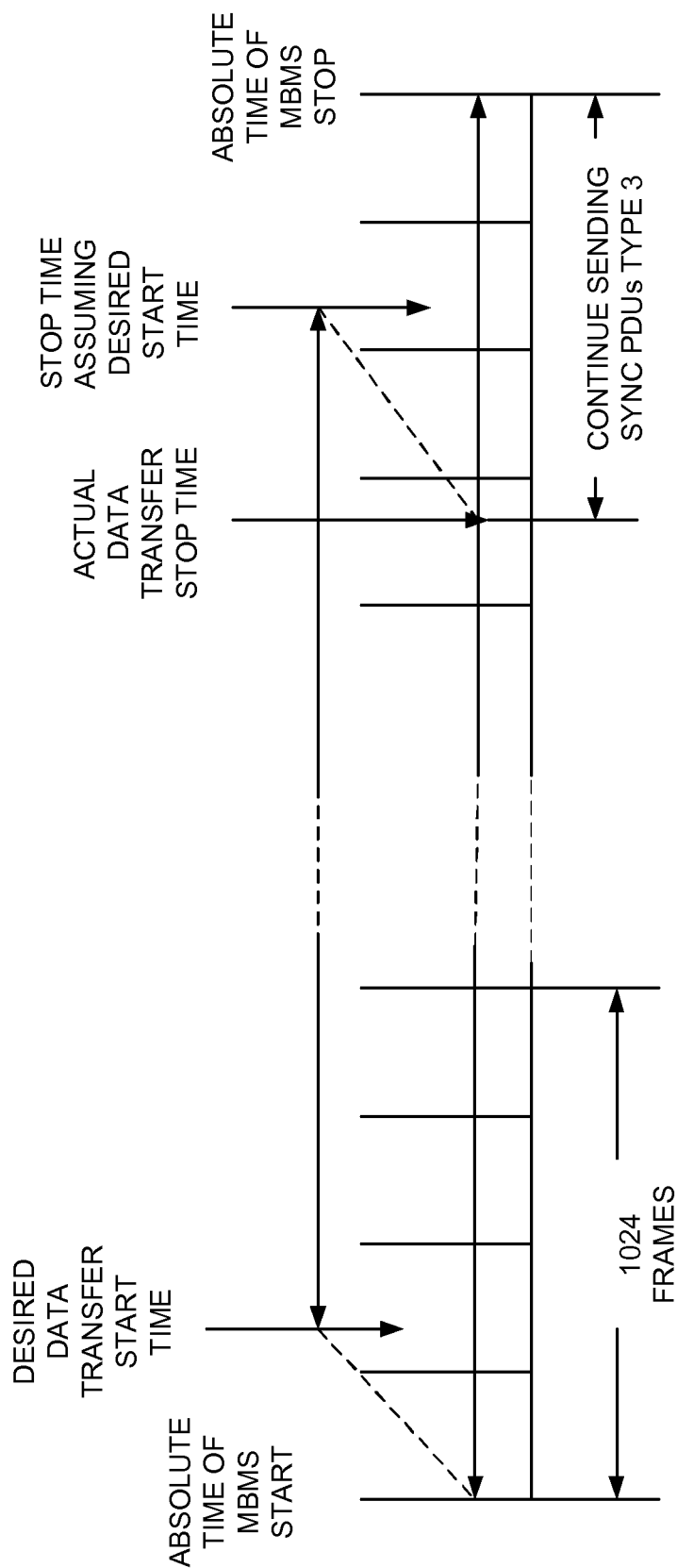
FIG. 11 is a timing diagram according to third embodiment where muting is avoided during starting and stopping a service.

FIG. 11 is a timing diagram for the third embodiment. In FIG. 11, the transfer of MBMS data is configured to start and stop at MCCH modification time period boundaries. In particular, the BM-SC detects boundaries corresponding to an integer multiple of 1024 radio frames aligned with GPS time 0, which coincides with MCCH modification period boundaries. Although the BM-SC 17 is unaware of the MCCH modification time period for a given area, the modification time period of 1024 radio frames is selected since this modification time period shares a boundary with a 512 radio frame MCCH modification time period. The BM-SC shifts the absolute start time to the nearest earlier 1024 radio frame boundary, which also shifts the absolute stop time by the same amount of time. An absolute time of MBMS data start is passed to the MCE 13 or to the base station/MCE 27 in an MBMS SESSION START REQUEST and an absolute time of MBMS data stop is passed to the MCE 13 or to the base station/MCE 27 in an MBMS SESSION STOP REQUEST. These values can be obtained as follows:

Absolute Time of MBMS Data START=FLOOR(desired data transfer start time, 1024 radio frames)
Absolute Time of MBMS Data STOP=CEILING(actual data transfer stop time, 1024 radio frames)

where the actual data transfer stop time is based on starting the data transfer at Absolute Time of MBMS Data START, not the desired data transfer start time. In other words, the start of data transfer is shifted to the previous MCCH modification time period boundary and the data transfer stop time is calculated accordingly.

Since the actual user data may end before Absolute Time of MBMS Data STOP, it may be necessary for the BM-SC 17 to continue sending SYNC PDUs type 3 after the end of user data. In this respect, this method is similar to the method of the second embodiment. The differences include that in the third embodiment, the BM-SC may stop sending SYNC PDU type 3 at Absolute Time of MBMS Data STOP. There is no need for the BM-SC 17 to continue transmitting SYNC PDUs type 3 past the data stop time signaled to the base station. Another difference is that the length of time the BM-SC 17 needs to continue sending SYNC PDU type 3 after the end of user data is reduced in the third embodiment. In the second embodiment, the length of time for sending the SYNC PDUs type 3 may always be 1024 radio frames, whereas in the third embodiment, the length of time for sending the SYNC PDUs type 3 depends on the difference between the actual data stop time and Absolute Time of MBMS Data STOP, and in general will be less than 1024 radio frames.

Thus, the third embodiment prevents muting of ongoing services of an MBMS during MSPs when an MTCH is started and stopped. The BM-SC 17 determines an absolute MBMS data start time equal to a floor function of a desired data transfer start time and a predetermined number of radio frames and sends this start time to the MCE. The BM-SC 17 determines an absolute MBMS data stop time equal to a ceiling function of an actual data transfer stop time and the predetermined number of radio frames, where the actual data transfer stop time is based on starting the data transfer at the determined absolute MBMS data start time. The BM-SC sends the determined absolute MBMS data stop time to the MCE.

Figure 12:
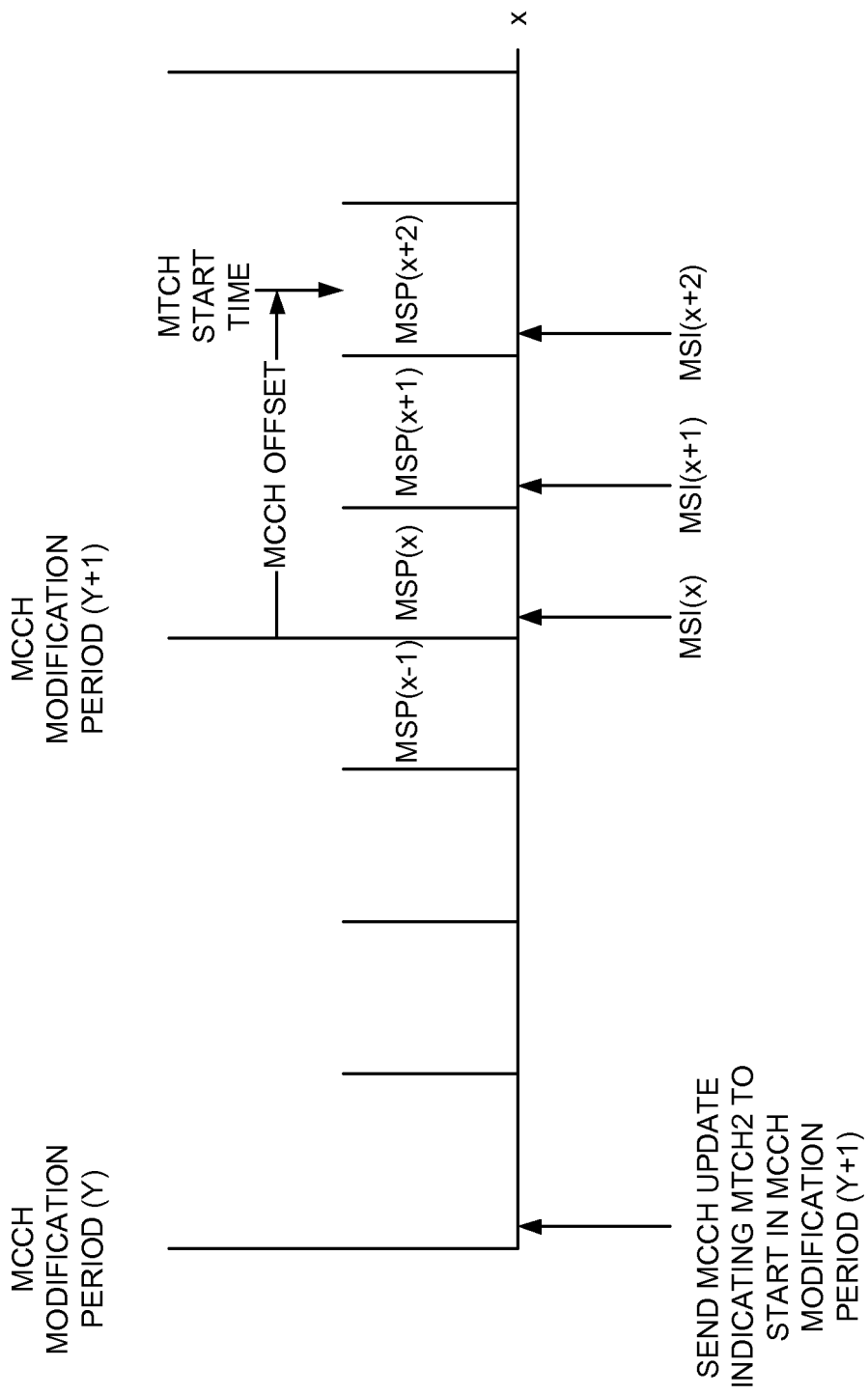
FIG. 12 is a timing diagram according to first implementation of a fourth embodiment where muting is avoided when starting a new service.

FIG. 12 is a timing diagram for the fourth embodiment configured to prevent muting when a new service is to be started. In FIG. 12, an MCCH update is sent to the base station 14 or to the base station/MCE 27. The MCCH update is sent from the stand alone MCE or the distributed MCE to the base station 14 or to the base station of the base station/MCE 27 at the beginning of the MCCH modification time period (Y). The MCCH update indicates that a second service MTCH2 is to start in MCCH modification time period (Y+1). As noted above with reference to FIG. 3, since the MCCH update is sent in MCCH modification time period (Y), the base station 14 or the base station of the base station/MCE 27 expects to send MSI(x) with information for MTCH2. However, in a conventional system, the SYNC PDUs corresponding to MTCH2 are not received in time to enable the base station to construct MSI(x) and MSI(x+1), so that the base station 14 or the base station of the base station/MCE 27 mutes the MCH corresponding to these MSIs. To avoid muting, the MCE 13 or the MCE of the base station/MCE 27 calculates an MCCH offset and sends this offset to the base station. The offset is measured from the starting boundary of the MCCH modification time period (Y+1) and indicates the start time of MTCH2 in MSP(x+2). Thus, since the base station now knows that the start time of the new service MTCH2 is in MSP(x+2), it will build MSI(x) and MSI(x+1) by assigning a Stop MTCH value of 2047 indicating that there is no data to send for MTCH2. The muting is avoided because the base station knows the exact time the new service starts.

Thus, one implementation of the fourth embodiment prevents muting when a new service is to be started. The MCE 13 or the MCE of the base station/MCE 27 sends an MCCH update at a start of an MCCH modification time period indicating that the new MTCH is to be started during a following MCCH modification time period. The MCE 13 or the MCE of the base station/MCE 27 also sends a calculated multicast control channel service start offset, MCCH-offset, indicating when the new MTCH is to be started after an MCCH boundary.

Figure 13:
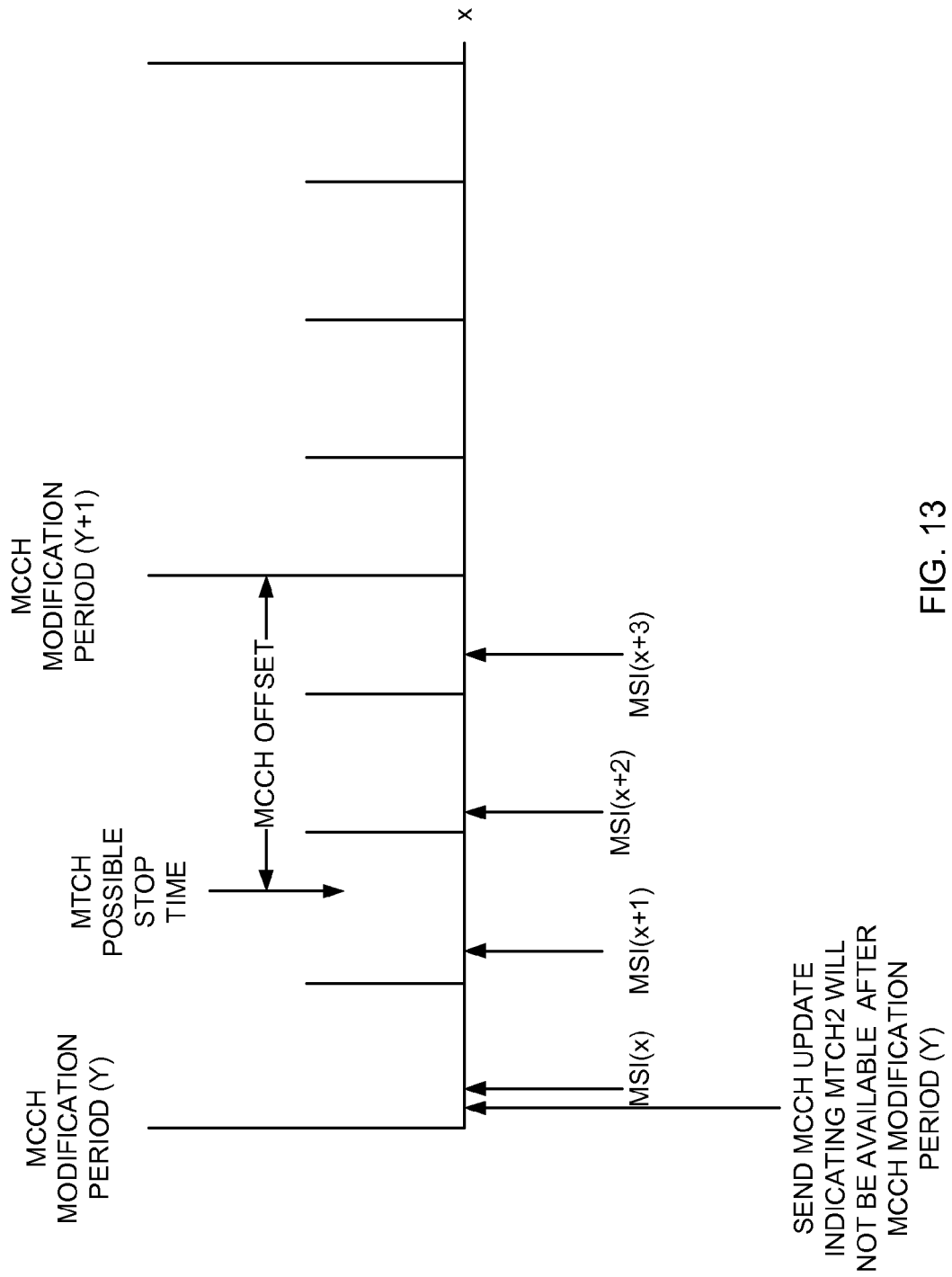
FIG. 13 is a timing diagram according to a second implementation of the fourth embodiment where muting is avoided when stopping an ongoing service.

FIG. 13 is a timing diagram for the fourth embodiment when stopping an ongoing service MTCH2. In FIG. 13, an MCCH update is sent at the beginning of MCCH modification time period (Y) indicating that the ongoing service MTCH2 will not be available after MCCH modification time period (Y), and the service MTCH2 stops during MCCH modification time period (Y). As noted above with reference to FIG. 4, the base station 14 expects to send MSI(x) with information concerning MTCH2. In particular, the Stop MTCH value for MTCH2 should be known when building MSI(x) and MSI(x+1). Since, in a conventional system, the Stop MTCH value is not known when building these MSIs, the MCH corresponding to these MSIs is muted. To avoid muting, the MCE 13 or the MCE of the base station/MCE 27 calculates an MCCH offset indicating when the service is stopping before the MCCH modification time period (Y+1), so that the base station knows that the service MTCH2 is stopping. The base station will then build MSI(x+2) and MSI(x+3) by assigning a Stop MTCH value of 2047 indicating that there is no data to send for these MSIs. The muting is avoided because the base station knows the exact time the service is to stop.

Thus, another implementation of the fourth embodiment prevents muting when a new service is to be stopped. The MCE 13 sends an MCCH update at a start of an MCCH modification time period indicating that the new MTCH is to be stopped during the MCCH modification time period. The MCE 13 also sends a calculated multicast control channel service stop offset, MCCH-offset, indicating when the new MTCH is to be stopped before the MCCH ending boundary of the MCCH modification time period.

The MTCH offset value to be sent in the cases described with reference to FIGS. 12 and 13 may be include as a new information element in the MBMS SCHEDULING INFORMATION message, as shown in part, in TABLE 1:

TABLE 1

| IE/Group Name | Presence | Range | IE type and reference | Semantics description |
|---|---|---|---|---|
| MBMS Session List per PMCH Item IEs | | 1 to <maxnoofSessions PerPMCH> | | |

TABLE 1-continued

| IE/Group Name | Presence | Range | IE type and reference | Semantics description |
|---|---|---|---|---|
| >MBMS Service Identity | M | | TMGI 9.2.3.3 | |
| >LCID | M | | INTEGER (0 . . . 28) | Logical Channel Identity |
| >MCCH-offset | M | | INTEGER (0 . . . 1024rf) | MCCH-offset value |

The MCCH update time and the MCCH-offset values can be derived from "Time of MBMS Data Transfer" and "Time of MBMS Data Stop" in the MBMS SESSION START REQUEST and MBMS SESSION STOP REQUEST messages, respectively.

Figure 14:
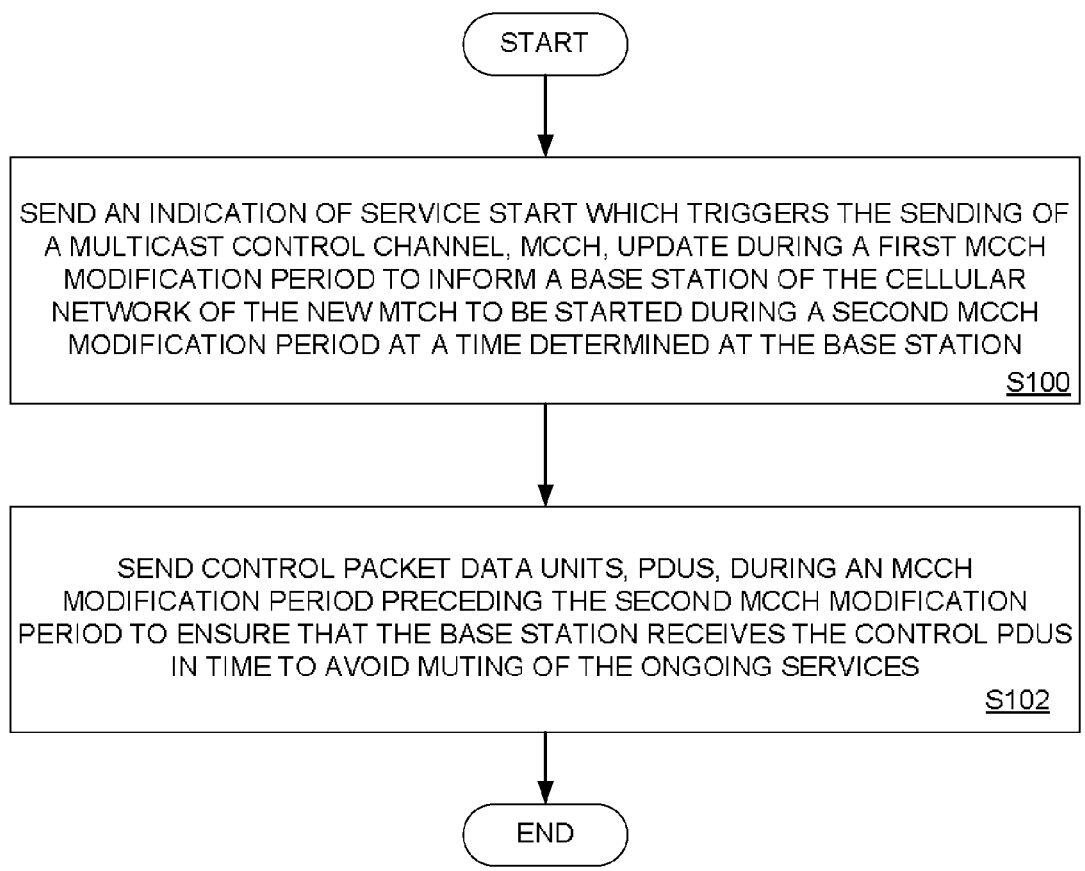
FIG. 14 is a flowchart of an exemplary process for starting a new MTCH while avoiding muting according to the first embodiment.

FIG. 14 is a flowchart of an exemplary process for starting a new MTCH while avoiding muting according to the first embodiment. The BM-SC 17 sends a service start indication that triggers the sending by the MCE 13 or the MCE of the base station/MCE 27 of an MCCH update during a first MCCH modification time period to inform a base station 14 or the base station of the base station/MCE 27 of the new MTCH to be started during a second MCCH modification time period at a time determined by the base station 14 or the base station of the base station/MCE 27 (block S100). SYNC PDUs type 3 are sent during an MCCH modification time period preceding the second MCCH modification time period to ensure that the base station receives the SYNC PDUs type 3 in time to avoid muting of the ongoing services (block S102).

Figure 15:
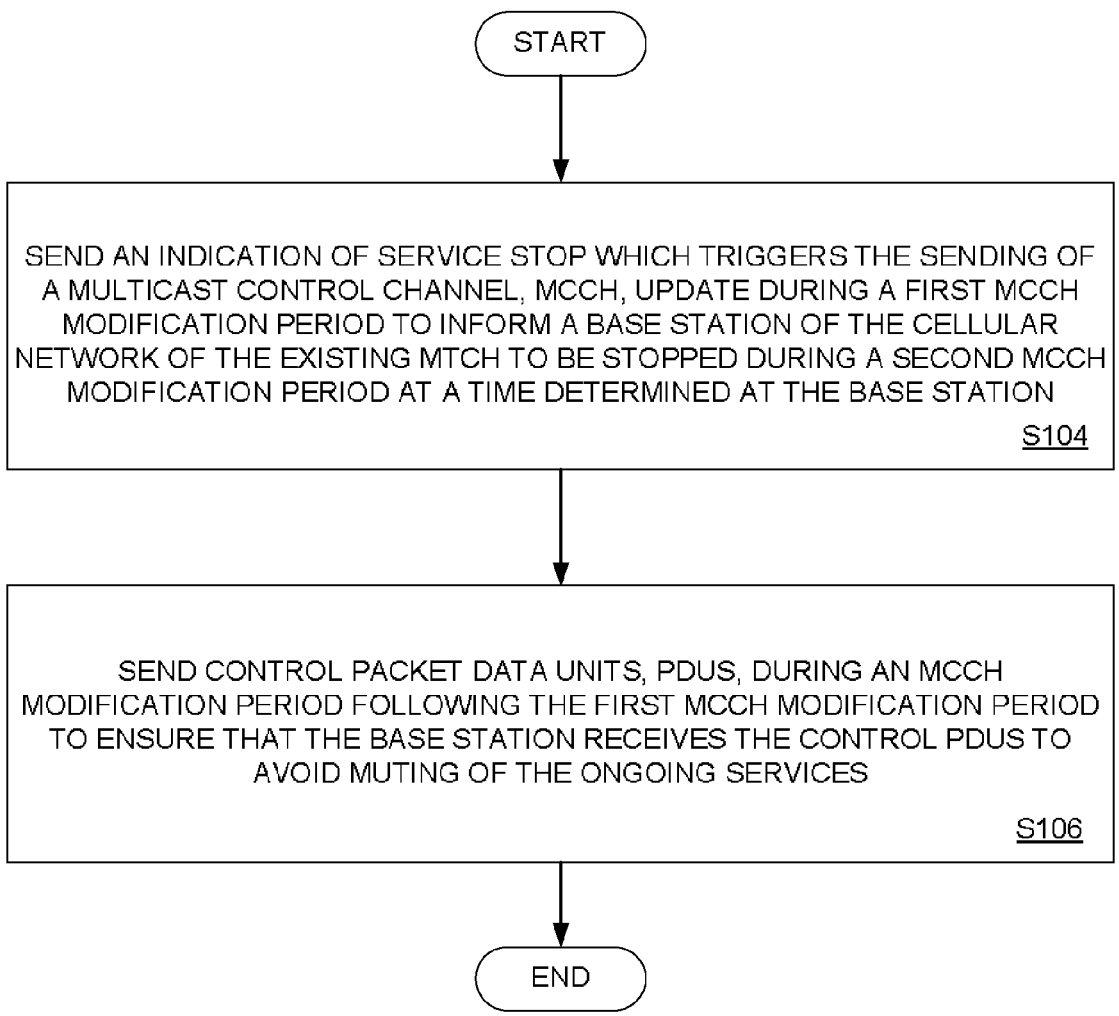
FIG. 15 is a flowchart of an exemplary process for stopping an existing MTCH while avoiding muting according to the second embodiment.

FIG. 15 is a flowchart of an exemplary process for stopping an existing MTCH while avoiding muting according to the second embodiment. The BM-SC 17 sends a service stop indication that triggers the sending of an MCCH, update during a first MCCH modification time period to inform a base station 14 or the base station of the base station/MCE 27 of the ongoing MTCH to be stopped during a second MCCH modification time period at a time determined at the base station (block S104). SYNC PDUs type 3 are sent during the first MCCH modification time period to ensure that the base station receives the SYNC PDUs type 3 in time to avoid muting of the ongoing services (block S106).

Figure 16:
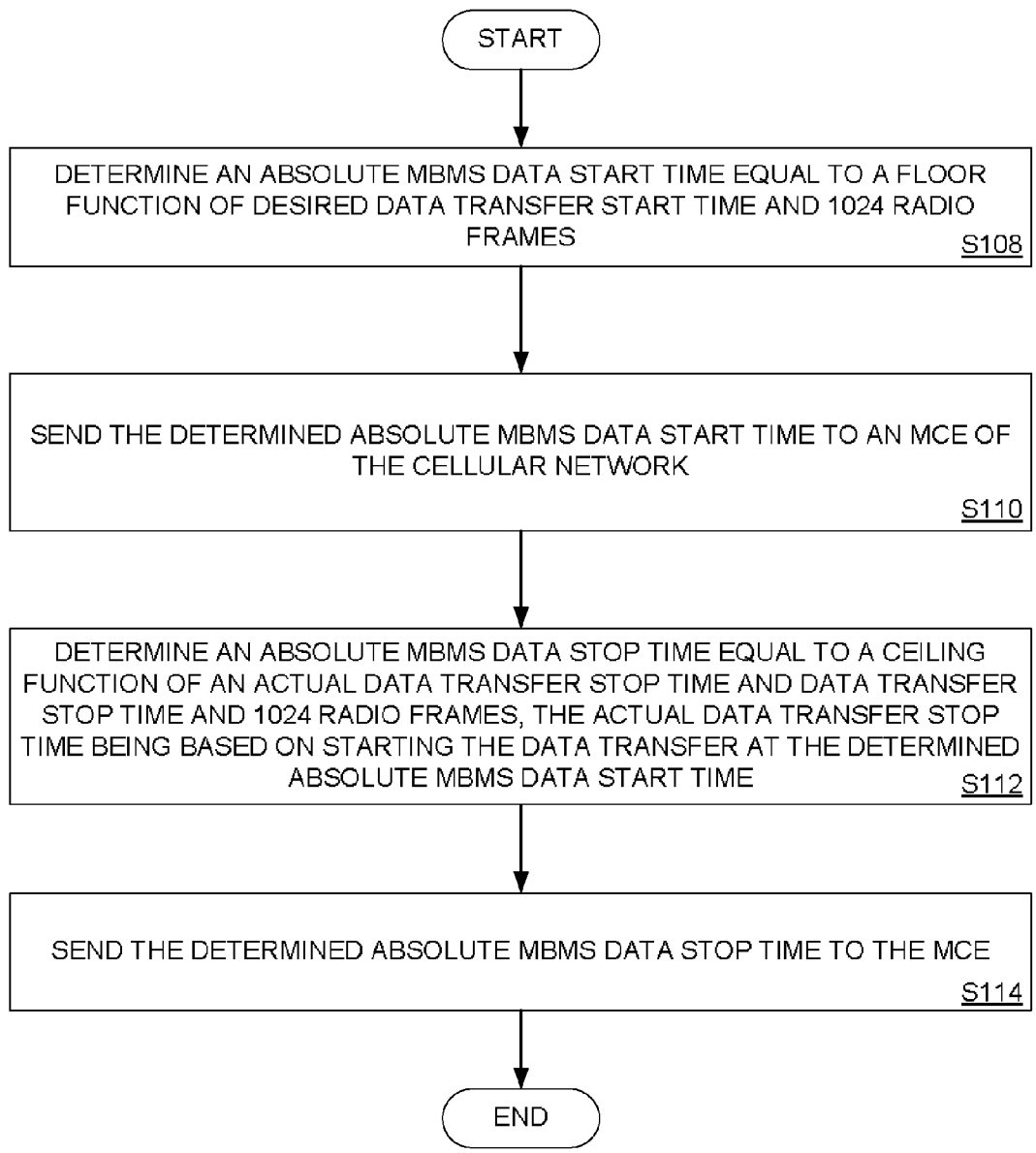
FIG. 16 is a flowchart of an exemplary process for starting and stopping a service while avoiding muting according to the third embodiment.

FIG. 16 is a flowchart of an exemplary process for starting and stopping a service while avoiding muting according to the third embodiment. The BM-SC 17 determines an absolute MBMS data start time equal to a nearest earlier boundary of 1024 radio frames (block S108). The BM-SC 17 sends the determined absolute MBMS data start time to the MCE (block S110). The BM-SC 17 determines an absolute MBMS data stop time equal to a nearest later boundary of 1024 radio frames, the actual data stop time being based on starting the data transfer at the determined absolute MBMS data start time (block S112). The BM-SC 17 sends the determined absolute MBMS data stop time to the MCE (block S114).

Figure 17:
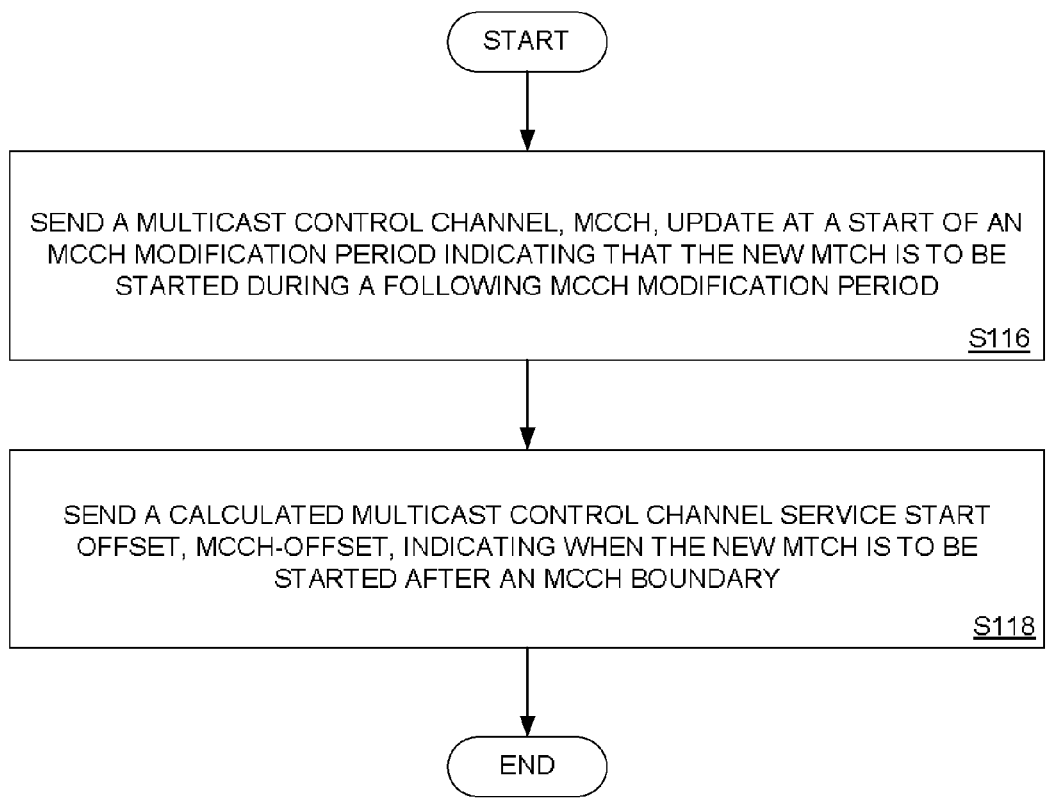
FIG. 17 is a flowchart of an exemplary process for starting a service while avoiding muting according to a first implementation of a fourth embodiment.

FIG. 17 is a flowchart of an exemplary process for starting a service while avoiding muting according to the first implementation of the fourth embodiment. The MCE 13 sends an MCCH update at a start of an MCCH modification time period indicating that the new MTCH is to be started during a following MCCH modification time period (block S116). The MCE 13 sends a calculated multicast control channel service start offset, MCCH-offset, indicating when the new MTCH is to be started after an MCCH modification time period ending boundary (block S118).

Figure 18:
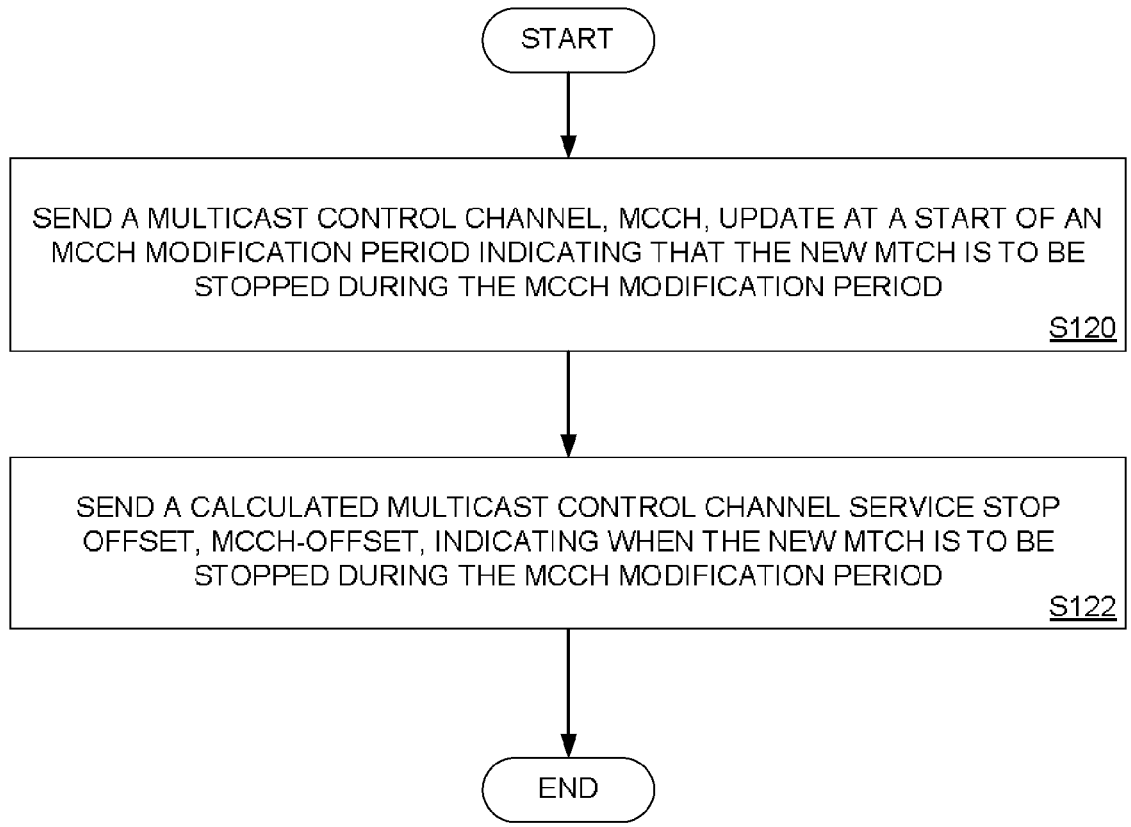
FIG. 18 is a flowchart of an exemplary process for stopping a service while avoiding muting according to a second implementation of the fourth embodiment.

FIG. 18 is a flowchart of an exemplary process for stopping a service while avoiding muting according to the second implementation of the fourth embodiment. The MCE sends an MCCH update at a start of an MCCH modification time period indicating that the new MTCH is to be stopped during the MCCH modification time period (block S120). The MCE sends a calculated multicast control channel service stop offset, MCCH-offset, indicating when the new MTCH is to be stopped before the MCCH modification time period ending boundary (block S122).

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of preventing muting of ongoing services of a multimedia broadcast and multicast service, MBMS, in a wireless communication network having a base station during multicast scheduling periods, MSPs, when a new multicast traffic channel, MTCH, is to be started, the method comprising:

sending an indication of service start to trigger sending of a multicast control channel, MCCH, update during a first MCCH modification period to inform the base station of the new MTCH to be started during a second MCCH modification period at a time determined at the base station; and sending control packet data units, PDUs, during an MCCH modification period preceding the second MCCH modification period, the PDUs arranged to avoid muting of the ongoing services.

2. The method of claim 1, wherein at least one of the control PDUs is a SYNC PDU type 3 that indicates that there is no data to send for the MTCH to be started.

3. The method of claim 2, wherein the indication that there is no data to send is a Stop MTCH value of 2047.

4. The method of claim 1, wherein the control PDUs are transmitted to the base station on an M1 interface.

5. The method of claim 4, wherein the indication of service start is sent to a multicell-multicast coordination entity, MCE, separate from the base station, the MCE performing admission control and radio resource allocation for a plurality of base stations in the wireless communication network.

6. A method of preventing muting of ongoing services of a multimedia broadcast and multicast service, MBMS, in a wireless communication network having a base station during multicast scheduling periods, MSPs, when an existing multicast traffic channel, MTCH, is to be stopped, the method comprising:

sending an indication of service stop to trigger sending of a multicast control channel, MCCH, update during a first MCCH modification period to inform the base station of the existing MTCH to be stopped during a second MCCH modification period at a time determined at the base station; and sending control packet data units, PDUs, during an MCCH modification period following the first MCCH modification period, the PDUs arranged to avoid muting of the ongoing services.

7. The method of claim 6, wherein at least one of the control PDUs is a SYNC PDU type 3 that indicates that there is no data to send for the existing MTCH to be stopped.

8. The method of claim 7, wherein the indication that there is no data to send is a Stop MTCH value of 2047.

9. The method of claim 8, wherein the control PDUs are transmitted to the base station on an M1 interface.

10. The method of claim 9, wherein the indication of service stop is sent to a multicell-multicast coordination entity, MCE, separate from the base station, the MCE performing admission control and radio resource allocation for a plurality of base stations in the wireless communication network.

11. A broadcast-multicast service center, BM-SC, configured to signal a base station to prevent muting of ongoing services of a multimedia broadcast and multicast service, MBMS, in a wireless communication network during multicast scheduling periods, MSPs, when a new multicast traffic channel, MTCH, is to be started, the BM-SC comprising:

a processor; and a memory containing executable computer instructions, that when executed by the processor, configure the processor to:

send an indication of service start to trigger a multicast control channel, MCCH, update during a first MCCH modification period to inform the base station of the new MTCH to be started during a second MCCH modification period at a time determined at the base station; and send control packet data units, PDUs, during an MCCH modification period preceding the second MCCH modification period, the PDUs arranged to avoid muting of the ongoing services.

12. The BM-SC of claim 11, wherein at least one of the control PDUs is a SYNC PDU type 3 that indicates that there is no data to send for the MTCH service to be started.

13. The BM-SC of claim 12, wherein the one of the control PDUs causes generation of a Stop MTCH value of 2047, indicating there is no data to send for the MTCH to be started.

14. The BM-SC of claim 11, wherein an MCCH update is sent by a multicell-multicast coordination entity, MCE, to the base station on an M2 interface.

15. A broadcast-multicast service center, BM-SC, configured to signal a base station to prevent muting of ongoing services of a multimedia broadcast and multicast service, MBMS, in a wireless communication network during multicast scheduling periods, MSPs, when an existing multicast traffic channel, MTCH, is to be stopped, the BM-SC comprising:

a processor; and a memory containing executable computer instructions, that when executed by the processor, configure the processor to:

send an indication of service stop to trigger a multicast control channel, MCCH, update during the first modification period to inform the base station of the existing MTCH to be stopped during a second MCCH modification period at a time determined at the base station; and send control packet data units, PDUs, during an MCCH modification period following the first MCCH modification period, the PDUs arranged to avoid muting of the ongoing services.

16. The BM-SC of claim 15, wherein at least one of the control PDUs is a SYNC PDU type 3 that indicates that there is no data to send for the MTCH service to be stopped.

17. The BM-SC of claim 16, wherein the one of the control PDUs causes generation of a Stop MTCH value of 2047, indicating there is no data to send for the MTCH to be stopped.

18. The BM-SC of claim 15, wherein an MCCH update is sent by a multicell-multicast coordination entity, MCE, to the base station on an M2 interface.

19. A broadcast-multicast service center, BM-SC, configured to signal a base station to prevent muting of ongoing services of a multimedia broadcast and multicast service, MBMS, in a wireless communication network during multicast scheduling periods, MSPs, when a new multicast traffic channel, MTCH, is to be started, the BM-SC (17) comprising:

a service start/stop module configured to indicate a service start to trigger generation of a multicast control channel, MCCH, update during a first MCCH modification period to inform the base station of the new MTCH to be started during a second MCCH modification period at a time determined at the base station; and a control packet data unit, PDU, module configured to generate and send PDUs during an MCCH modification period preceding the second MCCH modification period, the PDUs arranged to avoid muting of the ongoing services.

20. A broadcast-multicast service center, BM-SC, configured to signal a base station to prevent muting of ongoing services of a multimedia broadcast and multicast service, MBMS, in a wireless communication network during multicast scheduling periods, MSPs, when an existing multicast traffic channel, MTCH, is to be stopped, the BM-SC comprising:

a service start/stop module configured to indicate a service stop to trigger generation of a multicast control channel, MCCH, update during a first modification period to inform the base station of the existing MTCH to be stopped during a second MCCH modification period at a time determined at the base station; and a control packet data unit, PDUs, module configured to send PDUs during an MCCH modification period following the first MCCH modification period, the PDUs arranged to avoid muting of the ongoing services.

\* \* \* \* \*